US007028191B2

(12) United States Patent
Michener et al.

(10) Patent No.: US 7,028,191 B2
(45) Date of Patent: Apr. 11, 2006

(54) TRUSTED AUTHORIZATION DEVICE

(76) Inventors: John R. Michener, 2019 264th Pl. SE, Sammamish, WA (US) 98075-7971; Paul F. Ryan, 125A Clubhhouse Dr., Unit 9, Leesburg, VA (US) 20176

( * ) Notice: Subject to any disclaimer, the term of this patent is extended or adjusted under 35 U.S.C. 154(b) by 0 days.

(21) Appl. No.: 10/473,842

(22) PCT Filed: Apr. 1, 2002
(Under 37 CFR 1.47)

(86) PCT No.: PCT/US02/10353

§ 371 (c)(1),
(2), (4) Date: Aug. 12, 2004

(87) PCT Pub. No.: WO02/079960

PCT Pub. Date: Oct. 10, 2002

(65) Prior Publication Data

US 2005/0010786 A1    Jan. 13, 2005

Related U.S. Application Data

(60) Provisional application No. 60/280,090, filed on Mar. 30, 2001.

(51) Int. Cl.
*H04L 9/00* (2006.01)

(52) U.S. Cl. ................. 713/182; 713/168; 713/200; 713/201

(58) Field of Classification Search ............. 713/182, 713/168, 200, 201
See application file for complete search history.

(56) References Cited

U.S. PATENT DOCUMENTS 4,802,217 A    1/1989    Michener .................. 380/29

(Continued)

OTHER PUBLICATIONS

H. Abelson; R. Anderson; S.M. Bellovin; J. Benaloh; M. Blaze; W. Diffie; J. Gilmore; P.G. Neumann; R.L. Rivest; J.I. Schiller; B. Schneier, "The Risks of Key Recovery, Key Escrow, & Trusted Third Party Encryption", 1998, 21 pages, Internet publication downloaded from http://www.cdt.org/crypto/risks98/ on Mar. 28, 2002.

(Continued)

*Primary Examiner*—Thomas R. Peeso
(74) *Attorney, Agent, or Firm*—Raggio & Dinnin, P.C.

(57) ABSTRACT

A trusted display (18) of a trusted authorization device (TAD) (10) displays on a trusted display (18) first information about a transaction to be authorized by a user (14) using a trusted keypad (20). The TAD (10) generates (208) a random number (R); generates (1210) second information from the first information, the random number (R) and a first identification code (TADID-A) of the TAD (10); generates (212) a signature of the second information using a first encryption process; egnerates (216) a set of session keys (Ks1, Ks2, Ks3) by a second encryption process responsive to the random number (R) and a set of stored working keys ($K_{w1}$, $K_{w2}$, $K_{w3}$); and generates (218) third information by encrypting the second information and the signature using a third encryption process responsive to the set of session keys (Ks1, Ks2, Ks3). A dat structure (42) is formed comprising the random numer (R), the first identification code (TADID-A), and the third information; and communicated (220) from the TAD (10) to the client (12) to a host server (28) for verification by a verification decryption server (32).

40 Claims, 24 Drawing Sheets

U.S. PATENT DOCUMENTS

| | | | |
|---|---|---|---|
| 5,048,085 A | 9/1991 | Abraham et al. ............. | 380/23 |
| 5,351,293 A | 9/1994 | Michener et al. ............. | 380/21 |
| 5,590,199 A | 12/1996 | Krajewski, Jr. et al. ...... | 380/25 |
| 5,615,264 A | 3/1997 | Kazmierczak et al. ......... | 380/4 |
| 5,671,283 A | 9/1997 | Michener et al. ............. | 380/25 |
| 5,703,949 A | 12/1997 | Rosen ......................... | 380/21 |
| 5,748,740 A | 5/1998 | Curry et al. .................. | 380/25 |
| 5,764,762 A | 6/1998 | Kazmierczak et al. ......... | 380/4 |
| 5,838,812 A | 11/1998 | Pare, Jr. et al. ............. | 382/115 |
| 5,850,443 A | 12/1998 | Van Oorschot et al. ....... | 380/21 |
| 5,870,723 A | 2/1999 | Pare, Jr. et al. ............... | 705/39 |
| 5,901,284 A | 5/1999 | Hamdy-Swink ............ | 395/186 |
| 5,917,168 A | 6/1999 | Nakamura et al. .......... | 235/379 |
| 5,938,768 A | 8/1999 | Brennan ..................... | 713/202 |
| 5,940,510 A | 8/1999 | Curry et al. .................. | 380/25 |
| 6,064,988 A | 5/2000 | Thomas ....................... | 705/44 |
| 6,065,679 A | 5/2000 | Levie et al. ........... | 235/462.47 |
| 6,088,797 A | 7/2000 | Rosen ......................... | 713/173 |
| 6,105,013 A | 8/2000 | Curry et al. .................. | 705/65 |
| 6,125,446 A | 9/2000 | Olarig et al. ............... | 713/200 |
| 6,154,879 A | 11/2000 | Pare, Jr. et al. ................. | 902/3 |
| 6,163,771 A | 12/2000 | Walker et al. ................ | 705/18 |
| 6,175,921 B1 | 1/2001 | Rosen ......................... | 713/173 |
| 6,193,153 B1 | 2/2001 | Lambert ..................... | 235/380 |
| 6,236,981 B1 | 5/2001 | Hill ............................. | 706/67 |
| 6,237,095 B1 | 5/2001 | Curry et al. ................ | 713/178 |
| 6,307,936 B1 | 10/2001 | Ober et al. ................... | 380/30 |
| 6,311,272 B1 | 10/2001 | Gressel ....................... | 713/186 |
| 6,314,520 B1 | 11/2001 | Schell et al. ............... | 713/200 |
| 6,317,500 B1 | 11/2001 | Murphy ...................... | 380/258 |
| 6,331,817 B1 | 12/2001 | Goldberg ................. | 340/573.1 |
| 6,704,871 B1 | 3/2004 | Kaplan ....................... | 713/192 |
| 2001/0011352 A1 | 8/2001 | O'Mahony ................. | 713/200 |
| 2001/0018349 A1 | 8/2001 | Kinnunen et al. .......... | 455/456 |
| 2001/0050990 A1 | 12/2001 | Sudia ......................... | 380/286 |
| 2002/0002076 A1 | 1/2002 | Schneier et al. ............. | 463/29 |
| 2002/0023010 A1 | 2/2002 | Rittmaster et al. ............ | 705/26 |
| 2002/0023215 A1 | 2/2002 | Wang et al. ................ | 713/171 |
| 2002/0025045 A1 | 2/2002 | Raike ......................... | 380/280 |
| 2002/0029342 A1 | 3/2002 | Keech ........................ | 713/184 |
| 2002/0031225 A1 | 3/2002 | Hines ......................... | 380/247 |
| 2002/0035687 A1 | 3/2002 | Skantze ..................... | 713/168 |

OTHER PUBLICATIONS

J.R Michener, "System Insecurity in the Internet Age", IEEE Software, Jul./Aug. 1999, pp. 2-10.

J.R Michener; T. Acar, "Security Domains: Key Management in Large-Scale Systems", IEEE Software, Sep./Oct. 2000, pp. 52-58.

Aberdeen Group, Inc., "Preparing for the Rush to Privacy: An Executive White Paper", Jan. 2001, 13 pages, Internet publication from www.aberdeen.com.

J.R Michener; S.D. Mohan, "Clothing the E-Emperor", Computer, Sep./ 2001, pp. 94-96.

K.L. Lefebvre; W. Chang; G. Strongin, "The Trusted Client: AMD and Wave Mother Board Reference Design", Aug. 16, 2000, pp. 1-6, Internet publication downloaded from http://www.wave.com on Mar. 28, 2002.

"User Managed Privacy: A New Approach for Addresing Digital Privacy and Personal Information on the Internet", Nov. 13, 2000, Internet publication downloaded from http://www.wave.com on Mar. 28, 2002.

Wave Systems Corporation, "The Wave Embassy Architecture: Redefining Trust at the Network Edge", Jun. 2001, 17 pages, Internet publication downloaded from http://www.wave.com on Mar. 28, 2002.

Wave Systems and OneName Corporation, "New Solutions for Secure E-Commerce with Privacy Protection", 3 pages, Internet publication downloaded from http://www.wave.com on Mar. 28, 2002.

K.R. Lefebvre, "The Added Value of EMBASSY in the Digital World", pp. 1-12, Internet publication downloaded from http://www.wave.com on Mar. 28, 2002.

M. Ippolito, "Developing Applications for the EMASSY System, an ADK overview", 10 pages, Internet publication downloaded from http://www.wave.com on Mar. 28, 2002.

Hewlett-Packard Company and Wave Systems Corporation, "EMBASSY: A Trusted-client System: The EMBASSY E-Commerce System", 10 pages, Internet publication downloaded from http://www.wave.com on Mar. 28, 2002.

Various Internet Web pages downloaded from http://www.wave.com on Mar. 28, 2002, 37 pages.

"Enterprise Solutions . . . for the Digital Economy", 3 pages, Internet web pages downloaded from http://www.sspsolutions.com on Mar. 28, 2002.

"SSP Xboard-440TM", 2001-2002, 7 pages, Internet web pages downloaded from http://www.sspsolutions.com on Mar. 28, 2002.

Vasco, "Corporate Overview", 2002, 2 pages, Internet publication downloaded from http://www.vasco.com on Jun. 24, 2002.

Vasco, "DIGIPASS® Family of Authentication Devices: White Paper", 2001, 13 pages, Internet publication downloaded from http://www.vasco.com on Jun. 24, 2002.

Vasco, "Strong Authentication With DIGIPASS® Software: White Paper", 2001, 11 pages, Internet publication downloaded from http://www.vasco.com on Jun. 24, 2002.

Vasco, "Deploying Strong Authentication With DIGIPASS®; White Paper", 2001, 14 pages, Internet publication downloaded from http://www.vasco.com on Jun. 24, 2002.

Vasco, "VACAMAN® Controller Integration: White Paper", 2001, 22 pages, Internet publication downloaded from http://www.vasco.com on Jun. 24, 2002.

Vasco, "Securing the Web with VACMAN® Enterprise: White Paper", 2001, 28 pages, Internet publication downloaded from http://www.vasco.com on Jun. 24, 2002.

Vasco, "DIGIPASS® DESK 300", 2002, 2 pages, Internet publication downloaded from http://www.vasco.com on Jun. 24, 2002.

Vasco, "DIGIPASS® PRO 300", 2002, 2 pages, Internet publication downloaded from http://www.vasco.com on Jun. 24, 2002.

Vasco, "DIGIPASS® PRO 700", 2002, 2 pages, Internet publication downloaded from http://www.vasco.com on Jun. 24, 2002.

Vasco, "VACMAN® Server: White Paper", 2002, 24 pages, Internet publication downloaded from http://www.vasco.com on Jun. 24, 2002.

Vasco, "PKA—Private Key Access: Technical White Paper", 5 pages, Internet publcation downloaded from http://www.vasco.com on Jun. 24, 2002.

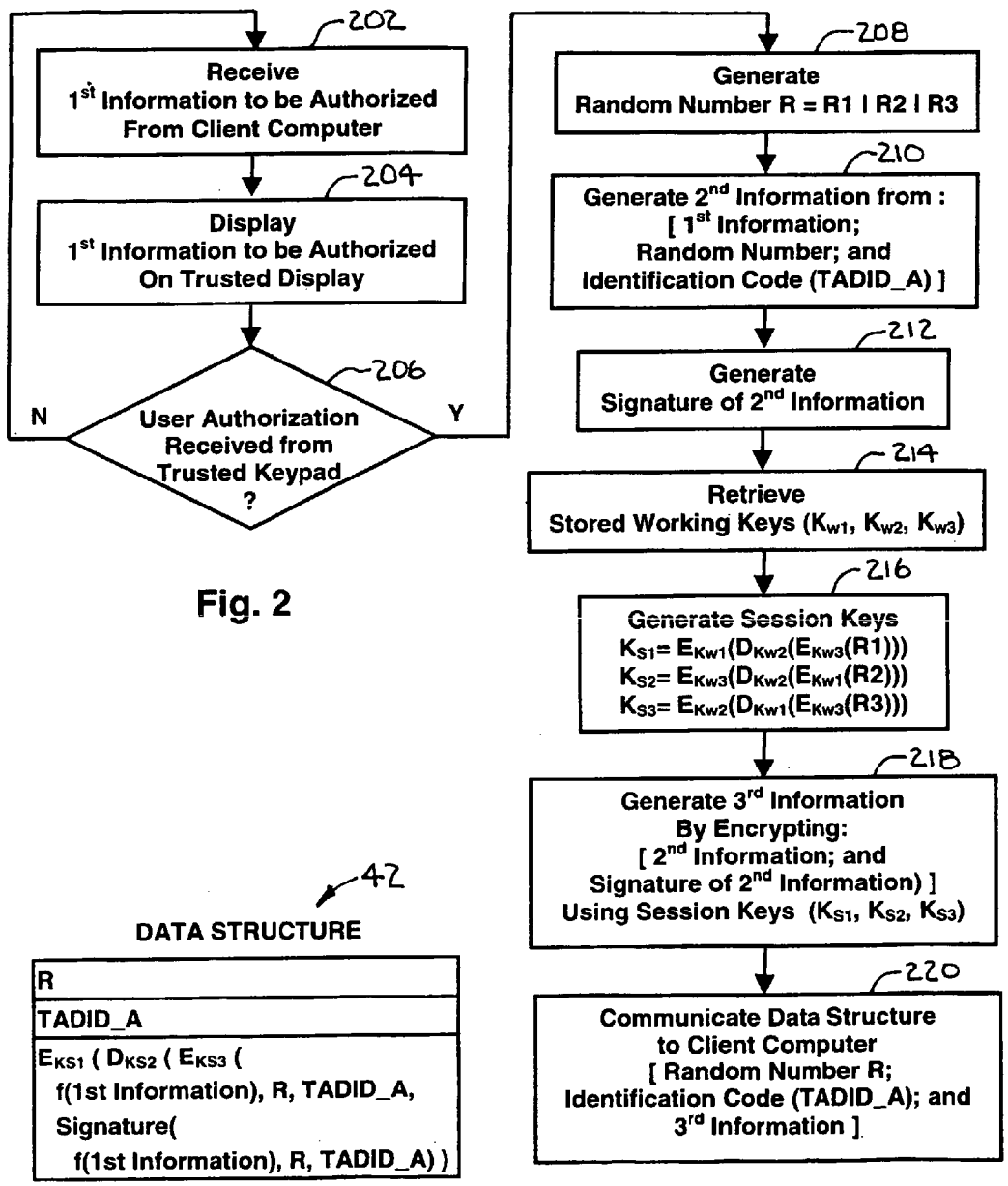

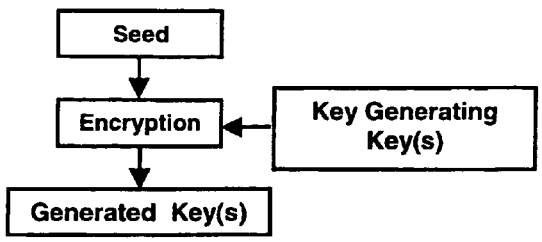
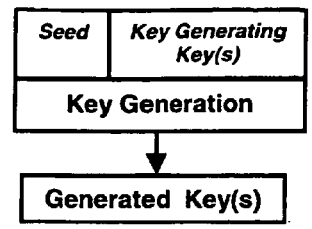
Fig. 4a
Fig. 4b
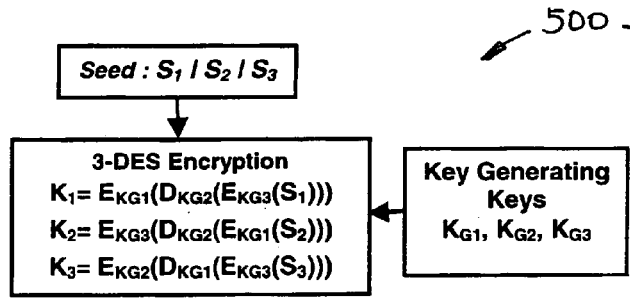
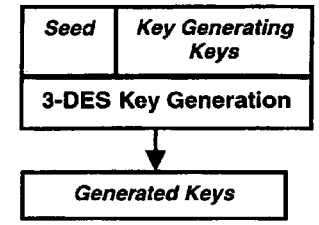
Fig. 5a
Fig. 5b
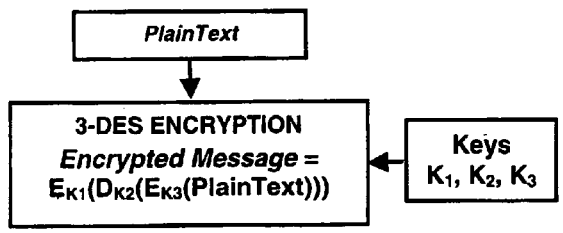
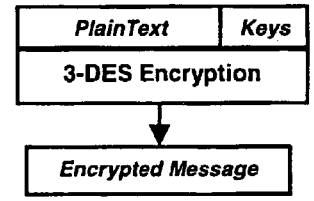
Fig. 6a
Fig. 6b
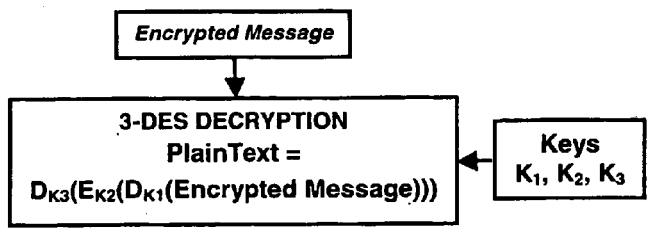
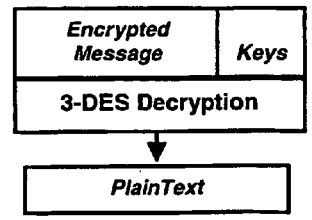
Fig. 7a
Fig. 7b

Fig. 18

| TAD INPUT COMMANDS | DESCRIPTION |
|---|---|
| A = Authorize | Begin Sign & Encrypt |
| I = Identify | Request TAD to identify it's version and Unit ID |
| L = Update Resv'd Language | Write optional language prompts |
| P = Personalize | Factory command to write Unit ID |
| R = Install New Unit Keys | Establish new Triple DES Unit keys |
| T = Test Maintenance Key | Generate and Encrypt Random Number |
| Y = Load ReKeying Keys | Load Rekeying Key Triplet |

Fig. 19

| TAD LANGUAGES |
|---|
| 1 = English |
| 2 = French |
| 3 = German |
| 4 = Spanish |
| 5, 6, 7 and 8 = Reserved |

Fig. 22

| FIELD TYPES | Length Range | Typical Length | Description |
|---|---|---|---|
| D0 to D9 | 1 to 20 | 20 | Display Data |
| T1 | 1 to 79 | 70 | Magnetic stripe card ISO Track 1 |
| T2 | 1 to 39 | 36 | Magnetic stripe card ISO Track 2 |
| P0 | 4 | 4 | Personal Identification Number (PIN) |
| G0 | 22 | 22 | GPS coordinates |

Fig. 23

| Element Identifier | Element Length | Element Type | Example | Remarks |
|---|---|---|---|---|
| Start of Text Token | 1 byte | STX | 02h | ASCII Non-Printable Char |
| Packet Length | 2 bytes | Binary | 7 | |
| Command ID | 1 byte | Alpha | 'A' | 'A' = Authorization |
| Error Indicator | 1 byte | Alpha | 'E' | 'E' indicates Error |
| Which Error | 1 byte | Alpha | '1' | '0' = incorrect command '1' = reject by user |
| CRC-16 | 2 bytes | Binary | | cyclical redundancy check |
| <CR><LF> | 2 bytes | Binary | 0Dh 0Ah | carriage return and line feed |

Fig. 20

| TAD INPUT COMMAND : AUTHORIZE DATA | | | | |
|---|---|---|---|---|
| Element Identifier | Element Length | Element Type | Example | Remarks |
| Start of Text Token | 1 byte | STX | 02H | ASCII Non-Printable Char |
| Packet Length | 2 bytes | Binary | | |
| Command ID | 1 byte | Alpha | 'A' | 'A' = Authorize (Begin Sign&Encrypt) |
| Language | 1 byte | Numeric | 1 | 1 = English |
| Display Count | 1 byte | Binary | | Number of fields to display |
| Field 0 identifier | 2 bytes | 1 byte = Char, 1 byte = Binary | | |
| Field 0 length | 2 bytes | Binary | | |
| Field 0 data | Field 0 length | Data | | Customer specified format |
| Field 1 identifier | 2 bytes | 2 byte = Char, 1 byte = Binary | | |
| Field 1 length | 2 bytes | Binary | | |
| Field 1 data | Field 1 length | Data | | Customer specified format |
| ... | | | | |
| Field n identifier | 2 bytes | 3 byte = Char, 1 byte = Binary | | |
| Field n length | 2 bytes | Binary | | |
| Field n data | Field n length | Data | | Customer specified format |
| CRC-16 | 2 bytes | Binary | | cyclic redundancy check |
| <CR> | 1 byte | Binary | 0Dh | carriage return |

Fig. 21a

| TAD RESPONSE TO AUTHORIZE DATA COMMAND : TAD DATA STRUCTURE : PLAINTEXT PORTION ||||| 
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 130h | The length of total packet |
| Command ID | 1 byte | Alpha | 'A' | 'A' = Authorize |
| Identifier | 8 Bytes | Alpha | 'ESI0001' | |
| Unit ID | 8 bytes | Numeric | 12345678 | |
| Data Length | 4 bytes | Binary | | Length of authorization data |
| Digest Algorithm | 2 bytes | Alpha | '0D' | |
| Encryption Algorithm | 2 bytes | Alpha | '0E' | |
| Random number | 24 bytes | Binary | | |
| Transaction counter | 4 bytes | Numeric | 0123 | |

Fig. 21b

| TAD RESPONSE TO AUTHORIZE DATA COMMAND : TAD DATA STRUCTURE : ENCRYPTED PORTION | | | | |
|---|---|---|---|---|
| Element Identifier | Element Length | Element Type | Example | Remarks |
| Field 0 identifier | 2 bytes | 1 byte = Char, 1 byte = Binary | 'D0' | |
| Field 0 length | 2 bytes | Binary | 20 | |
| Field 0 data | Field 0 length | Data | WAGER=200 pounds | Customer specified format |
| Field 1 identifier | 2 bytes | 1 byte = Char, 1 byte = Binary | 'D1' | |
| Field 1 length | 2 bytes | Binary | 20 | |
| Field 1 data | Field 1 length | Data | 'London / Sussex' | Customer specified format |
| Field 2 identifier | 2 bytes | 1 byte = Char, 1 byte = Binary | 'D2' | |
| Field 2 length | 2 bytes | Binary | 20 | |
| Field 2 data | Field 2 length | Data | 'By 1' | Customer specified format |
| ..... | | | | |
| Field n identifier | 2 bytes | 1 byte = Char, 1 byte = Binary | 'G0' | |
| Field n length | 2 bytes | Binary | 22 | |
| Field n data | Field n length | Data | '4155N 08757W 180 2134' | Customer specified format |
| Padding | Variable (0 to 7 bytes) | Binary | 00 | Added to make data length divisible by 8 |
| Digest | 16 bytes | Binary | | Data Integrity Check Starting from 'Identifier' field |
| TAD RESPONSE TO AUTHORIZE DATA COMMAND : TAD DATA STRUCTURE : END OF DATA STRUCTURE | | | | |
| CRC16 | 2 bytes | Binary | | cyclic redundancy check |
| <CR><LF> | 2 bytes | Binary | 0Dh 0Ah | carriage return and line feed |

Fig. 24

PlainText Portion

| | Element Identifier | Element Length | Element Type | Example | Remarks |
|---|---|---|---|---|---|
| 1 | Start Of Data Structure | 8 bytes | Static "ESIPnnnn" | ESI5AD4A | where n = some variable |
| 2 | TAD Unit ID | 8 bytes | Alphanumeric | B1122330 | |
| 3 | Total Packet length | 4 bytes | Numeric | 1050 | |
| 4 | Packet Digest Algorithm ID | 2 bytes | Alphanumeric | 1D | |
| 5 | Packet Encryption Algorithm ID | 2 bytes | Alphanumeric | 0E | |
| 6 | Random number | 16 bytes | Binary | BBBBBBBBBBBBBBBB | |
| 7 | Transaction counter | 4 bytes | Numeric | 0011 | |

Encrypted Portion

| | Element Identifier | Element Length | Element Type | Example | Remarks |
|---|---|---|---|---|---|
| 1 | Field 0 identifier | 4 bytes | Alpha/numeric | 0WAG | Client Spec. - Wager |
| 2 | Field 0 length | 4 bytes | Alpha/numeric | 0009 | |
| 3 | Field 0 data | Field 0 length | Alpha/numeric | 100pounds | |
| 4 | Field 1 identifier | 4 bytes | Alpha/numeric | 1GAM | Client Spec. - Game |
| 5 | Field 1 length | 4 bytes | Alpha/numeric | 0006 | |
| 6 | Field 1 data | Field 1 length | Alpha/numeric | soccer | |
| 7 | Field 2 identifier | 4 bytes | Alpha/numeric | 2NAR | Client Spec. - Narrative |
| 8 | Field 2 length | 4 bytes | Alpha/numeric | 0022 | |
| 9 | Field 2 data | Field 2 length | Alpha/numeric | sussexoverliverpoolby1 | |
| 10 | Field 3 identifier | 4 bytes | Alpha/numeric | 3CD# | Client Spec. - Card Number |
| 11 | Field 3 length | 4 bytes | Alpha/numeric | 0016 | |
| 12 | Field 3 data | Field 3 length | Alpha/numeric | 1111222233334444 | |
| 13 | Field 4 identifier | 4 bytes | Alpha/numeric | 4EXD | Client Spec. - Expiration Date |
| 14 | Field 4 length | 4 bytes | Alpha/numeric | 0004 | |
| 15 | Field 4 data | Field 4 length | Alpha/numeric | 0311 | |
| 16 | Field k data | | Alpha/numeric | see Fig. 25 | Digital Signature |

End of Data Structure (unencrypted)

| | Element Identifier | Element Length | Element Type | Example | Remarks |
|---|---|---|---|---|---|
| 1 | End of Data Structure | 4bytes | Static :::: | :::: | |

Fig. 25

Prior to signing and encrypting

| PlainText Portion | ESI5AD4AB1122233010501D0EBBBBBBBBBBBB0011 |
|---|---|
| Portion to be Encrypted | 0WAG0009100POUNDS1GAM0006SOCCER2NAR0022SUSSEXOVERLIVERPOOLBY13CD#00161 111222233334444444EXD00040311:::: |

After signing

| PlainText Portion | ESI5AD4AB1122233010501D0EBBBBBBBBBBBB0011 |
|---|---|
| Portion to be Encrypted | 0WAG0009100POUNDS1GAM0006SOCCER2NAR0022SUSSEXOVERLIVERPOOLBY13CD#00161 111222233334444444EXD00040311 |
| Signature | asdf;lkjasdf;lkjasdf;lkjasdflkj:::: |

After encrypting

| PlainText Portion | ESI5AD4AB1122233010501D0EBBBBBBBBBBBB0011 |
|---|---|
| Encrypted Portion | ZXCV/.,MZXCV/.,MZXCV/.,MZXCVUIoZXCV98UIZXCV98UIZXCV98UIZXCV98 UIZXCV98UIZXCV98UIZXCV98UIZXCV98UIZXCV98:::: |

Fig. 26a

| TAD INPUT COMMAND : Load Rekeying Keyset | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 28 | |
| Command ID | 1 byte | Alpha | 'Y' | 'Y' = Load Rekeying Keys |
| Triple DES Keys | 24 bytes | Data | | Format Specified in TAD output Spec |
| CRC-16 | 2 bytes | Binary | | cyclical redundancy check |
| <CR> | 1 byte | Binary | 0Dh | carriage return |

Fig. 26b

| TAD RESPONSE TO Load Rekeying Keyset COMMAND | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 5 | |
| Command ID | 1 byte | Alpha | 'Y' | 'Y' = Load Rekeying Keys |
| CRC-16 | 2 bytes | Binary | | cyclical redundancy check |
| <CR><LF> | 2 bytes | Binary | 0Dh 0Ah | carriage return and line feed |

Fig. 27a

| TAD INPUT COMMAND : Install New Unit Keyset | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 52 | |
| Command ID | 1 byte | Alpha | 'R' | 'R' = Rekey |
| Random Number | 24 bytes | Data | | clear text random used to formulate session keys with rekey keyset |
| Encrypted Unit ID | 24 bytes | Data | | Format Specified in TAD output Spec |
| CRC-16 | 2 bytes | Binary | | cyclical redundancy check |
| <CR> | 1 byte | Binary | 0Dh | carriage return |

Fig. 27b

| TAD RESPONSE TO Install New Unit Keyset COMMAND | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 5 | |
| Command ID | 1 byte | Alpha | 'R' | 'R' = Rekey |
| CRC-16 | 2 bytes | Binary | | cyclical redundancy check |
| <CR><LF> | 2 bytes | Binary | 0Dh 0Ah | carriage return and line feed |

Fig. 28a

TAD INPUT COMMAND : Insert New Language Command

| Element Identifier | Element Length | Element Type | Example | Remarks |
|---|---|---|---|---|
| Start Of Text Token | 1 byte | STX | 02h | ASCII Non-Printable Char |
| Packet Length | 2 bytes | Binary | 145 | |
| Command ID | 1 byte | Alpha | 'L' | 'L' = Insert New Language |
| Language | 1 byte | Numeric | 5 | 5 = new language |
| prompt 1 | 20 bytes | Alpha | ' YES/NO ' | |
| prompt 2 | 20 bytes | Alpha | 'USE MAG CARD?' | |
| prompt 3 | 20 bytes | Alpha | ' SWIPE CARD ' | |
| prompt 4 | 20 bytes | Alpha | ' USE PIN? ' | |
| prompt 5 | 20 bytes | Alpha | ' ENTER PIN ' | |
| prompt 6 | 20 bytes | Alpha | ' PROCESS DATA? ' | |
| prompt 7 | 20 bytes | Alpha | ' ENCRYPTING ' | |
| CRC-16 | 2 bytes | Binary | | cyclical redundancy check |
| <CR> | 1 byte | ASCII | 0Dh | |

Fig. 28b

TAD RESPONSE TO Insert New Language Command COMMAND

| Element Identifier | Element Length | Element Type | Example | Remarks |
|---|---|---|---|---|
| Start of Text Token | 1 byte | STX | 02h | ASCII Non-Printable Char |
| Packet Length | 2 bytes | Binary | 6 | |
| Command ID | 1 byte | Alpha | 'L' | 'L' = Insert New Language |
| Language | 1 byte | Numeric | 5 | 5 = new language |
| CRC-16 | 2 bytes | Binary | | cyclical redundancy check |
| <CR><LF> | 2 bytes | Binary | 0Dh 0Ah | carriage return and line feed |

Fig. 29a

| TAD INPUT COMMAND : Identify TAD to CLIENT | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 4 | |
| Command ID | 1 byte | Alpha | 'I' | 'I' = Identify |
| CRC-16 | 2 bytes | Binary | | cyclical redundancy check |
| <CR> | 1 byte | Binary | 0Dh | carriage return |

Fig. 29b

| TAD RESPONSE TO Identify TAD to CLIENT COMMAND | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 33 | |
| Command ID | 1 byte | Alpha | 'I' | 'I' = Identify |
| Firmware Version | 20 bytes | Alpha | 'ESI-TAD v1.00' | |
| Unit ID | 8 bytes | Numeric | 00000001 | |
| CRC-16 | 2 bytes | Binary | | cyclical redundancy check |
| <CR><LF> | 2 bytes | Binary | 0Dh 0Ah | carriage return and line feed |

Fig. 30a

| TAD INPUT COMMAND : Test TAD Maintenance Key | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 4 | |
| Command ID | 1 byte | Alpha | 'T' | 'T' = Test Maintenance Key |
| CRC-16 | 2 bytes | Binary | | Cyclical redundancy check |
| <CR> | 1 byte | Binary | 0Dh | Carriage return |

Fig. 30b

| TAD RESPONSE TO Test TAD Maintenance Key COMMAND | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 61 | |
| Command ID | 1 byte | Alpha | 'T' | 'T' = Test Maintenance Key |
| Random Number | 24 bytes | Numeric | | 2 hex digits 32h = 50 |
| Encrypted section | 32 bytes | Numeric | | encrypted Unit ID and Random Number |
| CRC-16 | 2 bytes | Binary | | cyclical redundancy check |
| <CR><LF> | 2 bytes | Binary | 0Dh 0Ah | carriage return and line feed |

Fig. 31b

| TAD INPUT COMMAND : Personalize TAD | | | | |
|---|---|---|---|---|
| Element Identifier | Element Length | Element Type | Example | Remarks |
| Start Of Text Token | 1 byte | STX | 02h | ASCII Non-Printable Char |
| Packet Length | 2 bytes | Binary | 98 | |
| Command ID | 1 byte | Alpha | 'P' | 'P' = Personalize |
| Unit ID Number | 8 bytes | Alpha | '12345678' | |
| KeyDebounceDelay | 2 bytes | Hexadecimal ASCII | '32' | |
| KeyRepeatSpeed | 2 bytes | Hexadecimal ASCII | '32' | |
| LCD Contrast | 2 bytes | Hexadecimal ASCII | '1E' | "1E" = 0x1e = 01Eh = 30 |
| Title Line 1 | 20 bytes | Alpha | 'Enterprise Solutions' | |
| Title Line 2 | 20 bytes | Alpha | 'Incorporated' | |
| Title Line 3 | 20 bytes | Alpha | 'Trusted' | |
| Title Line 4 | 20 bytes | Alpha | 'Authorization Device' | |
| CRC-16 | 2 bytes | Binary | | cyclical redundancy check |
| <CR> | 1 byte | ASCII | 0Dh | |

Fig. 31b

| TAD RESPONSE TO Personalize TAD COMMAND | | | | |
|---|---|---|---|---|
| Element Identifier | Element Length | Element Type | Example | Remarks |
| Start of Text Token | 1 byte | STX | 02h | ASCII Non-Printable Char |
| Packet Length | 2 bytes | Binary | 5 | |
| Command ID | 1 byte | Alpha | 'P' | 'P' = Personalize |
| CRC-16 | 2 bytes | Binary | | cyclical redundancy check |
| <CR><LF> | 2 bytes | Binary | 0Dh 0Ah | carriage return and line feed |

TRUSTED AUTHORIZATION DEVICE

CROSS-REFERENCE TO RELATED APPLICATIONS

The instant application claims the benefit of U.S. Provisional Application Ser. No. 60/280,090 filed on Mar. 30, 2001, which is incorporated herein by reference.

BRIEF DESCRIPTION OF THE DRAWINGS

In the accompanying drawings:

FIG. 2 illustrates a process for providing for a trusted authorization of a transaction from the point-of-view of an associated Trusted Authorization Device (TAD);

FIG. 3 illustrates as data structure used by a process for providing for a trusted authorization of a transaction;

FIG. 4a illustrates an encryption process for generating a set of encryption keys;

FIG. 4b illustrates a schematic representation of the process illustrated in FIG. 4a;

FIG. 5a illustrates 3-DES encryption process for generating a set of encryption keys;

FIG. 5b illustrates a schematic representation of the process illustrated in FIG. 5a;

FIG. 6a illustrates 3-DES encryption process for encrypting a message;

FIG. 6b illustrates a schematic representation of the process illustrated in FIG. 6a;

FIG. 7a illustrates 3-DES decryption process for decrypting an encrypted message;

FIG. 7b illustrates a schematic representation of the process illustrated in FIG. 6a;

FIG. 11b illustrates a schematic representation of the process illustrated in FIG. 11a;

FIG. 12b illustrates a schematic representation of the process illustrated in FIG. 11a;

FIG. 18 illustrates a table of TAD input commands;

FIG. 19 illustrates a table of TAD language codes;

FIG. 20 illustrates a structure of a TAD input command for authorizing data;

FIGS. 21a illustrates a plaintext portion of a data structure of a TAD response to command for authorizing data;

FIG. 21b illustrates an encrypted portion of a data structure of a TAD response to command for authorizing data;

FIG. 22 illustrates a table of data field types associated with a TAD data structure;

FIG. 23 illustrates a structure of an error response data packet from a TAD to a client computer if an authorization is either aborted or incorrect;

FIG. 24 illustrate a structure of TAD response to command for authorizing data;

FIG. 25 illustrate an example of a TAD data structure at various processing stages;

FIG. 26a illustrates a structure of a TAD input command for loading a rekeying keyset;

FIG. 26b illustrates a structure of a TAD response to a command for loading a rekeying keyset;

FIG. 27a illustrates a structure of a TAD input command for installing a new working keyset;

FIG. 27b illustrates a structure of a TAD response to a command for installing a new working keyset;

FIG. 28a illustrates a structure of a TAD input command for installing a new language;

FIG. 28b illustrates a structure of a TAD response to a command for installing a new language;

FIG. 29a illustrates a structure of a TAD input command for identifying a TAD to a client computer;

FIG. 29b illustrates a structure of a TAD response to a command for identifying a TAD to a client computer;

FIG. 30a illustrates a structure of a TAD input command for testing a TAD maintenance key;

FIG. 30b illustrates a structure of a TAD response to a command for testing a TAD maintenance key;

FIG. 31a illustrates a structure of a TAD input command for personalizing a TAD; and FIG. 31b illustrates a structure of a TAD response to a personalizing a TAD.

DESCRIPTION OF EMBODIMENT(S)

Electronic communications, and the data which traverses those communications, are relatively new, as is the technology used to protect electronic data. Existing communications protection technologies tend to fall into two categories. The first, government sponsored, is generally very well thought out and provides excellent protection, but is not readily available for commercial applications. The second, de facto commercial, are mostly not strong enough to protect important information, or are dedicated to specific functions. For example, standard point-of-sale devices are dedicated to merchandizing applications, and existing ATM systems are dedicated to the dispensing of cash.

There exists a need for a device to provide personal protection of electronic data that is small, easy to use, provides excellent protection to the PC/laptop user, and that can operate in conjunction with corresponding devices at a central data gathering point to provide near real time validation of the information.

As one example, involving financial transactions over the internet by a user, a financial institution may desire an enhanced level of security so as to verify that the user is who they say they are and that they have truly authorized a particular transaction. As another example, in a business-to-business environment, a paycheck processing company needs to know with virtual certainty the authenticity of instructions from associated business clients for making payroll distributions. As yet another example, in a gaming environment, a user of internet gaming services may wish to transfer funds from a credit card to a gaming card so as to participate in internet gaming, a transaction for which the credit card issuer generally demands authentication of the user and verification of the transaction so as to avoid a later repudiation of the transaction by the user.

Figure 1:
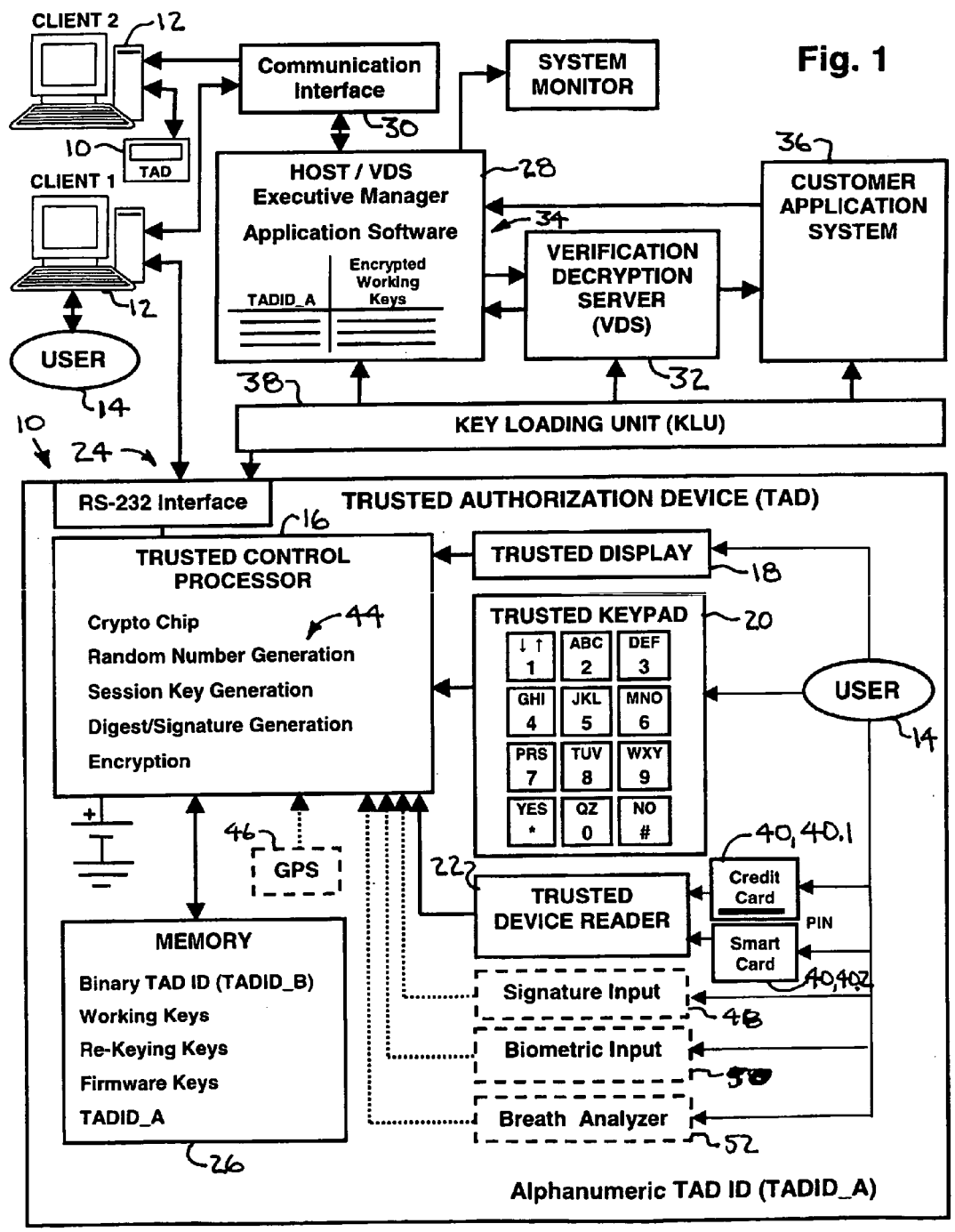
FIG. 1 illustrates a block diagram of a trusted authorization device and an associated transaction processing system.

Referring to FIG. 1, a Trusted Authorization Device 10 (or TAD) is operatively connected to an untrustworthy client 12 (for example, a personal computer or workstation PC) operated by a user 14. The TAD 10 provides a trustworthy subsystem that allows the authorization of electronic data transactions or actions while electronically connected to the untrustworthy client 12 platform in a potentially hostile environment. The TAD 10 comprises a trusted control processor 16, a trusted display 18, a trusted keypad 20 (e.g. a numeric keypad, or an alphanumeric keyboard), and a trusted device reader 22 (e.g. a magnetic stripe card, a chip card, a smart cart, etc.). In one embodiment, the TAD 10 is a computer ancillary hardware device that provides a trusted environment for the display and authorization of transactions/authorizations that can be compactly represented in human understandable form. The TAD 10 is operatively connected to the client 12 with a telecommunications channel 24, for example, a serial telecommunications (RS-232) interface that is constrained by the trusted control processor 16. A telecommunications channel 24 that is hardwired directly to the client 12 and not out-of-sight therefrom provides for enhanced security.

The trusted control processor 16 and associated memory 26 are, for example, securely packaged in a tamper-proof, hardened housing, that if tampered with causes at least essential elements of the TAD 10 to either self-destruct or become inoperable and virtually undecipherable. For example, the trusted control processor 16 may be adapted with either a light sensor or a pressure sensor or both, which would cause the memory 26 to be erased response to an associated detection of light or pressure change that would result from tampering with the housing of the trusted control processor 16 and/or associated memory 26. The trusted control processor 16 is a dedicated CPU in the TAD 10 that controls and/or manages the trusted display 18, trusted keypad 20, trusted device reader 22, and the telecommunications channel 24.

The trusted control processor 16 provides for the following capabilities:
1. A unique and well protected ID;
2. Embedded unique implementation of cryptographic algorithms (including digest algorithms, asymmetric encryption with public/private keys and symmetric encryption with private/private keys);
3. Random number generation;
4. Functionality to derive unique session keys per transaction from random generation sub process;
5. Cryptographic functionality to enable signing (digest and/or public/private encryption keys) and data encryption (private/private encryption keys) functionality;
6. Ability to protect the TAD encryption keys from observation or alteration. This involves on-chip hardening and system auto-destruct functionality in event of tamper detection. Tamper detection sensing is embedded in the TAD 10;
7. Ability to display proposed transactions supplied from host and load supplied information into appropriate data structures for transmission;
8. Ability to capture and load data from integrated TAD devices;
9. Client PC interface, trusted keypad, trusted device reader, e.g. card reader;
10. Optional camera, biometric input devices, and/or GPS receiver; and
11. Ability to integrate all authorized information into a transaction data structure, digitally sign this data structure, strongly and uniquely encrypt the appropriate portions of the structure, and transmit this data structure to the host for further transmission.

The trusted display 18 is, for example, a separate display constrained by trusted control processor 16 and not subject to intercept, control or modification by a host system. The trusted display 18 displays the transaction or authorization to be performed, for example in a compact embodiment, on a 4 line by 20 character screen.

The trusted keypad 20 is, for example, a numeric key pad (with alpha functionality) that is constrained by the trusted control processor 16 and whose data is not subject to interception, alteration, or replacement by signals from the client 12. The trusted keypad 20 is used by a user to enter information and accept or refuse a transaction.

The trusted device reader 22 is, for example, a magnetic card/smart card reader that is constrained to communicate with the trusted control processor 16 and whose information is not subject to interception, alteration, or replacement by signals from the client 12. The trusted device reader 22 provides a means for the user 14 to provide proof of possession or the associated magnetic card/smart card, and thereby enable the TAD 10 to authenticate the transaction request. The trusted device reader 22 may, for example, be a hybrid card reader, enabling it to support the usage of chip cards in a trustworthy environment. Such chip cards provide an appropriate environment for accessing user-specific public key-enabled functionality.

The client 12 is operatively connected, e.g. via the Internet, to a host server 28 having a communication interface 30. For example, the host server 28 could be operated by a service provider that requires an enhanced level of trust in the authorization of transactions or requests by the user 14 running particular application software of the service provider, and accordingly, who would provide a TAD 10 to the user 14 for authenticating transactions with the necessary enhanced level of trust.

The host server 28 interfaces with a verification decryption server 32 (VDS), for example, via a VDS executive manager 34, and may also, or alternatively, interface with a customer application system 36 running associated application software, and also interfaced with the VDS 32.

Each TAD 10 is provided with a unique alphanumeric ID (TADID_A) and a unique and well-protected binary ID (TADID_B), each of which are stored in memory 26. The alphanumeric ID (TADID_A) is also visible on the outside of an associated housing of the TAD 10 for purposes of identifying the particular device, for example for purposes of maintenance or physical distribution control. The associated trusted control processors 16 are also provided with embedded unique implementations of cryptographic algorithms, including at least one algorithm for generating a signature—which may include a digest process—(e.g. asymmetric encryption with public/private keys) and at least one algorithm for encrypting data (e.g. symmetric encryption with private/private keys), the later of which relies upon associated keys that are stored in the TAD 10 by a key loading unit 38 (KLU).

Referring to FIG. 2, in operation, in step (202) the untrustworthy client 12 downloads a proposed transaction or action to the TAD 10 for authorization, for example at the request of the user 14. Then, in step (204), the user 14, viewing the trusted display 18 and using the trusted keypad 20, pages through the proposed transaction, thereby providing a basis of trust for the action to be authorized. When the user 14 wishes to authorize the transaction, the user 14 can accept the transaction by pressing the appropriate key, or sequence of keys, on the trusted keypad 20. The user 14 may then further couple a unique physical token 40—e.g. a magnetic stripe card 40.1 or a smart card 40.2—to the trusted device reader 22, and then enter a personal PIN number associated therewith on the trusted keypad 20, thereby authenticating the identity of the user 14. Alternately, or in addition, the TAD 10 may require the user 14 to enter a PIN number associated with the TAD 10.

Then, in step (206), if the user 14 authorizes the transaction, then the trusted control processor 16 stores the displayed first information, the captured card information, and all other necessary information (e.g. PIN, location from an associated trusted location device e.g. GPS receiver, etc) as second information in an associated data fields of an associated data structure 42, e.g. illustrated in FIG. 3, wherein the second information is responsive to, or a function of the first information, and may comprise a copy of the first information. Otherwise, from step (206), the process repeats with step (202), wherein the TAD 10 awaits further input from the client 12. Then, in step (208), a random number generator 44—e.g. within the trusted control processor 16—generates a random number R, which may be either a pseudo-random number, or a true random number, for example, generated responsive to a noisy physical process. The TAD 10 may also access and increment a transaction counter, although this step is not essential. Then, in step (210), the trusted control processor 16 generates second information that is responsive to the first information displayed to the user, and which further incorporates the random number R and a first identification code of the TAD 10, e.g. the alphanumeric ID (TADID_A). Then, in step (212) the trusted control processor 16 generates a digital signature of the second information—thereby providing a basis for authorization and non-repudiation of the transaction—using a first encryption process, for example, an irreversible digest algorithm (e.g. an asymmetric encryption algorithm). Then, in steps (214) and (216), the trusted control processor 16 respectively retrieves a set of stored working keys $K_{w1}$, $K_{w2}$, $K_{w3}$ from the memory 26, and generates a set of transaction-specific session keys Ks1, Ks2, Ks3 using a second encryption process—generally illustrated in FIGS. 4a, 4b, and illustrated for a 3-DES encryption process in FIGS. 5a and 5b—using the random number R as a seed. The working keys Kw1, Kw2, Kw3 are stored in the memory 26 by a key loading process described hereinbelow. Then, in step (218), trusted control processor 16 generates third information by encrypting the combination of the second information from step (210), and the associated signature from step (212), using a third encryption process, for example a 3-DES encryption process as illustrated in FIGS. 6a and 6b. Then, in step (220), the data structure 42 comprising the plaintext random number R, the plaintext alphanumeric ID (TADID_A), and the third information is communicated to the client 12, and communicated thereby to the host server 28. The host server 28 sends the data structure 42 to the VDS 32 for decryption and signature verification thereby, and if authenticated by the VDS 32, the transaction is processed by either the host server 28 or the associated customer application system 36. If a transaction counter is used, the value of the transaction counter would be incorporated in the second information (which is signed), and may also be incorporated as plaintext in the data structure 42.

For example, if the user is interfaced with the host server 28 is via an Internet browser, a user may select, via the browser, a transaction to be conducted—for example, the transfer of funds from an account accessed via a standard financial card or a transaction within a custom domain. The browser then uses associated TAD 10 interface software to transfer the proposed transaction and instructions to the TAD 10 for authorization.

Figure 8:
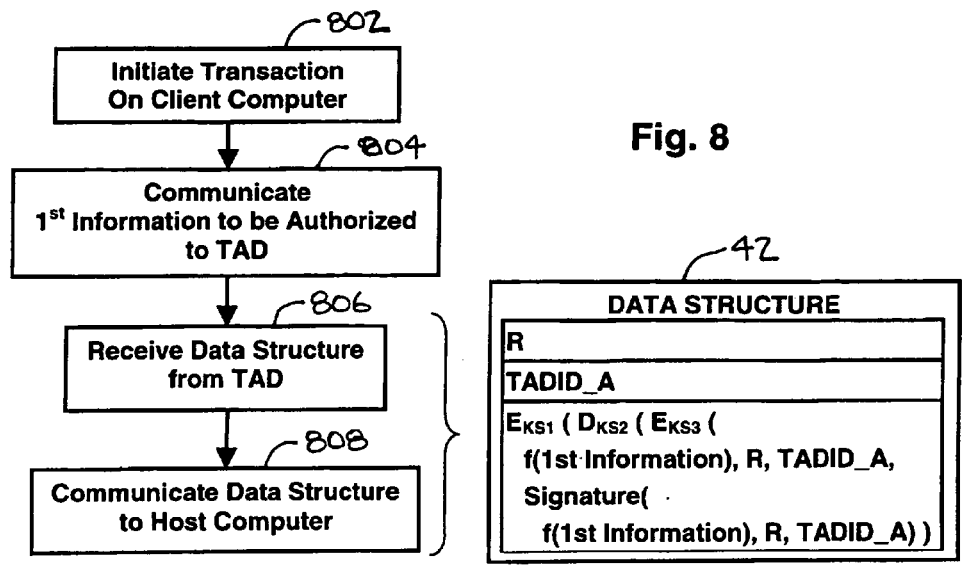
FIG. 8 illustrates a process for providing for a trusted authorization of a transaction from the point-of-view of an associated client computer.

Referring to FIG. 8, from the point of view of the client 12, the above described process commences in step (802), wherein the user 14 initiates a transaction on a client 12 in communication with the host server 28. For example, the user 14 initiates a transaction on the Internet involving a purchase that the user 14 wishes to finance by a credit card, i.e. a magnetic stripe card 40.1. In step (804), responsive to the host server 28 requesting a trusted authorization of the transaction, a first information to be authorized is communicated to the TAD 10, and in step (806), if the user 14 has authorized the transaction using the TAD 10, the client 12 receives the associated data structure 42 from the TAD 10, and, in step (808), communicates this to the host server 28.

Figure 9:
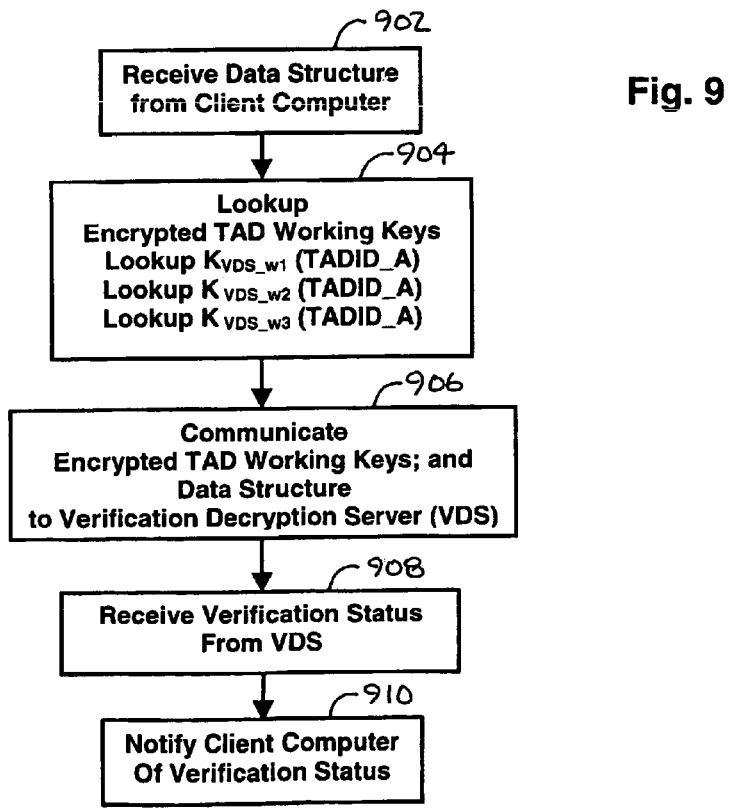
FIG. 9 illustrates a process for providing for a trusted authorization of a transaction from the point-of-view of an associated host computer.

Referring to FIG. 9, from the point of view of the host server 28, in step (902), the host server 28 receives the data structure 42 from the client 12, in step (904), extracts the alphanumeric ID (TADID_A) from the plaintext portion of the data structure 42 and uses a lookup process to find an associated set of VDS encrypted TAD working keys $K_{VDS\_w1}$, $K_{VDS\_w2}$, $K_{VDS\_w3}$ that are encrypted using a VDS key that is not known by the host server 28. Then, in step (906), the VDS encrypted TAD working keys $K_{VDS_{13}\_w1}$, $K_{VDS\_w2}$, $K_{VDS\_W3}$ and the data structure 42 are communicated by the host server 28 to the VDS 32, responsive to which, in step (908), the host server 28 receives a verification status from the VDS 32, and in step (910), the host server 28 communicates this verification status to the client 12.

Figure 10:
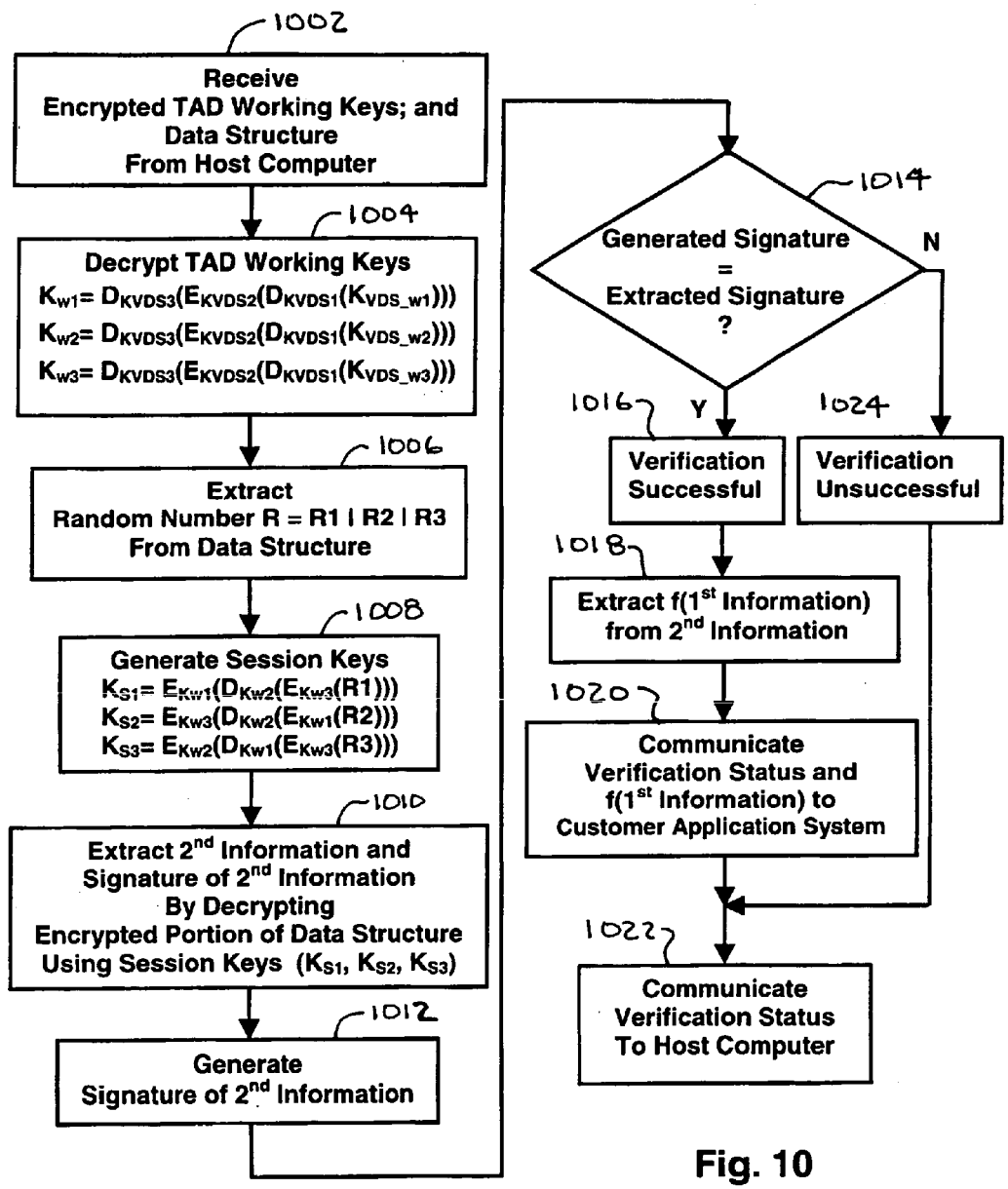
FIG. 10 illustrates a process for providing for a trusted authorization of a transaction from the point-of-view of an associated Verification Decryption Server (VDS)

Referring to FIG. 10, from the point of view of the verification decryption server 32 (VDS), in step (1002), the verification decryption server 32 receives the VDS encrypted TAD working keys $K_{VDS\_w1}$, $K_{VDS\_w2}$, $K_{VDS\_w3}$ and the data structure 42 from the host server 28. Then, in step (1004), the VDS 32 decrypts the VDS encrypted TAD working keys $K_{VDS\_w1}$, $K^{VDS}_{\_w2}$, $K_{VDS\_w3}$ using associated VDS keys $K_{VDS1}$, $K_{VDS2}$, $K_{VDS3}$ stored on the VDS 32 and loaded thereon by the key loading unit 38. Then, in step (1006), the VDS 32 extracts the plaintext random number R from the data structure 42, and in step (1008), uses the random number R as a seed, together with the decrypted TAD working keys $K_{w1}$, $K_{w2}$, $K_{w3}$ from step (1004) to generate—by a key generating process 500 as illustrated in FIGS. 5a and 5b—a set of session keys Ks1, Ks2, Ks3 that are used in step (1010) to decrypt the encrypted portion (i.e. the second information) of the data structure 42, for example, in accordance with a 3-DES decryption process as illustrated in FIGS. 7a and 7b. Then, in step (1012), the VDS 32 generates a signature of the second information using the same first encryption process as had been used in the TAD 10, and in step (1014), if the extracted, decrypted signature from step (1010) is the same as the generated signature from step (1012), then in step (1016), the verification process is successful, and in steps (1018) and (1020), the information responsive to the first information is extracted from the second information, and then communicated to the customer application system 36 to complete the transaction, after which the customer application system 36 notifies the host server 28 that the transaction has been completed successfully. Then, in step (1022), the verification status is communicated by the VDS 32 to the host server 28. If, from step (1014), the generated signature is not equal to the extracted, decrypted signature, then, in step (1024), the verification process is unsuccessful, and this verification status is communicated to the host server 28 in step (1022).

The TAD 10 incorporates three sets of stored keys that are used in various encryption processes, 1) a set of read-only firmware keys $K_{F1}$, $K_{F2}$, $K_{F3}$, 2) a set of rekeying keys $K_{RK1}$, $K_{RK2}$, $K_{RK3}$ that are initially loaded on the TAD 10 by the key loading unit 38, and 3) a set of working keys $K_{w1}$, $K_{w2}$, $K_{w3}$ that are loaded on the TAD 10 during a rekeying operation by the key loading unit 38, either directly connected to the TAD 10, or remotely via a mailed floppy disk. The TAD 10 uses the working keys $K_{w1}$, $K_{w2}$, $K_{w3}$ to generate the transaction-specific session keys Ks1, Ks2, Ks3 in accordance with a key generating process 500, as described hereinabove. The key loading unit 38 loads the rekeying keys $K_{RK1}$, $K_{RK2}$, $K_{RK3}$ and the working keys $K_{w1}$, $K_{w2}$, $K_{w3}$ on the TAD 10 by transferring an encrypted key seed to the TAD 10, after which the TAD 10 generates the respective keys using a key generating process 500, in which the TAD 10 and the key loading unit 38 each utilize prearranged secret keys to encrypt the key seed. For example, both binary ID (TADID_B) and the firmware keys $K_{F1}$, $K_{F2}$, $K_{F3}$ are known to both the TAD 10 and the key loading unit 38, wherein the key loading unit 38 is able to determine the binary ID (TADID_B) from a lookup process, given the alphanumeric ID (TADID_A) of the TAD 10. Accordingly, both the key loading unit 38 and the TAD 10 can independently use the key generating process 500—with the binary ID (TADID_B) as the seed (with S1=S2=S3=TADID_B) and the firmware keys $K_{F1}$, $K_{F7}$, $K_{F3}$ as the generating keys—to generate a set of maintenance keys maintenance keys $K_{M1}$, $K_{M2}$, $K_{M3}$. The key loading unit 38 then uses the maintenance keys $K_{M1}$, $K_{M2}$, $K_{M3}$ to encrypt a rekey random number RkR, which is then transferred in encrypted form to the TAD 10, which then decrypts the rekey random number RkR and uses this as a seed, together with the maintenance keys $K_{M1}$, $K_{M2}$, $K_{M3}$ as generating keys, to generate the rekeying keys $K_{RK1}$, $K_{RK2}$, $K_{RK3}$. Similarly, the key loading unit 38 can use the same rekey random number RkR as a seed, and the same maintenance keys $K_{M1}$, $K_{M2}$, $K_{M3}$ as generating keys, to independently generate identical rekeying keys $K_{RK1}$, $K_{RK2}$, $K_{RK3}$. Then, the key loading unit 38 can use the rekeying keys $K_{RK1}$, $K_{RK2}$, $K_{RK3}$ to encrypt a working key random number that is transferred to the TAD 10 to be used thereby as a seed in accordance with the key generating process 500 to generate the TAD working keys $K_{w1}$, $K_{w2}$, $K_{w3}$, wherein the rekeying keys $K_{RK1}$, $K_{RK2}$, $K_{RK3}$ are used as associated key generating keys. The key loading unit 38 is used to load the VDS encrypted TAD working keys $K_{VDS\_w1}$, $K_{VDS\_w2}$, $K_{VDS\_w3}$ on the VDS 32, using VDS keys for the encryption, after which the TAD rekeying keys $K_{RK1}$, $K_{RK2}$, $K_{RK3}$ and TAD working keys $K_{w1}$, $K_{w2}$, $K_{w3}$ are destroyed on the key loading unit 38 so that the key loading unit 38 cannot become a single point source of security failure.

Figure 11A:
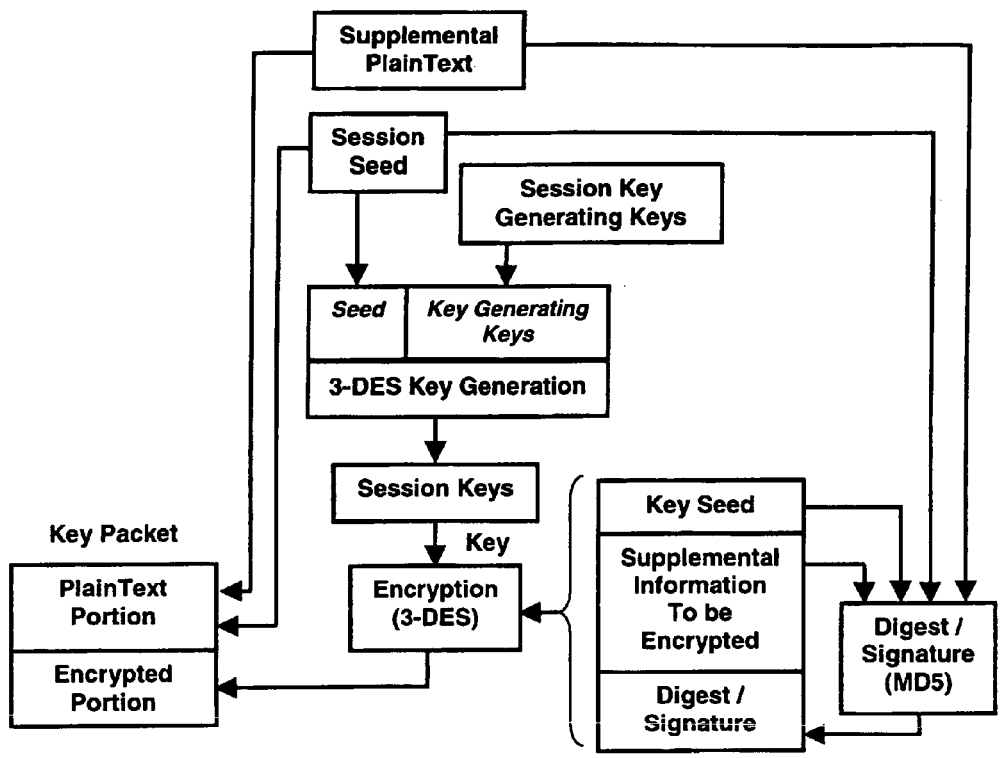
FIG. 11a illustrates a key loading process from the point-of-view of an associated Key Loading Unit (KLU)
Figure 11B:
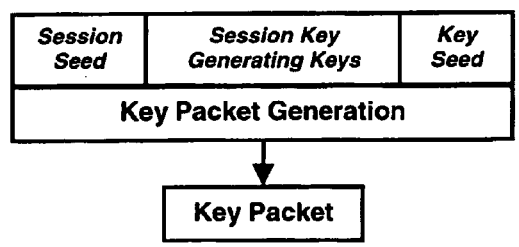

The process by which the key loading unit 38 transfers and encrypted key seed to the TAD 10 is illustrated in FIG. 11a, and is represented schematically in FIG. 11b.

Figure 12A:
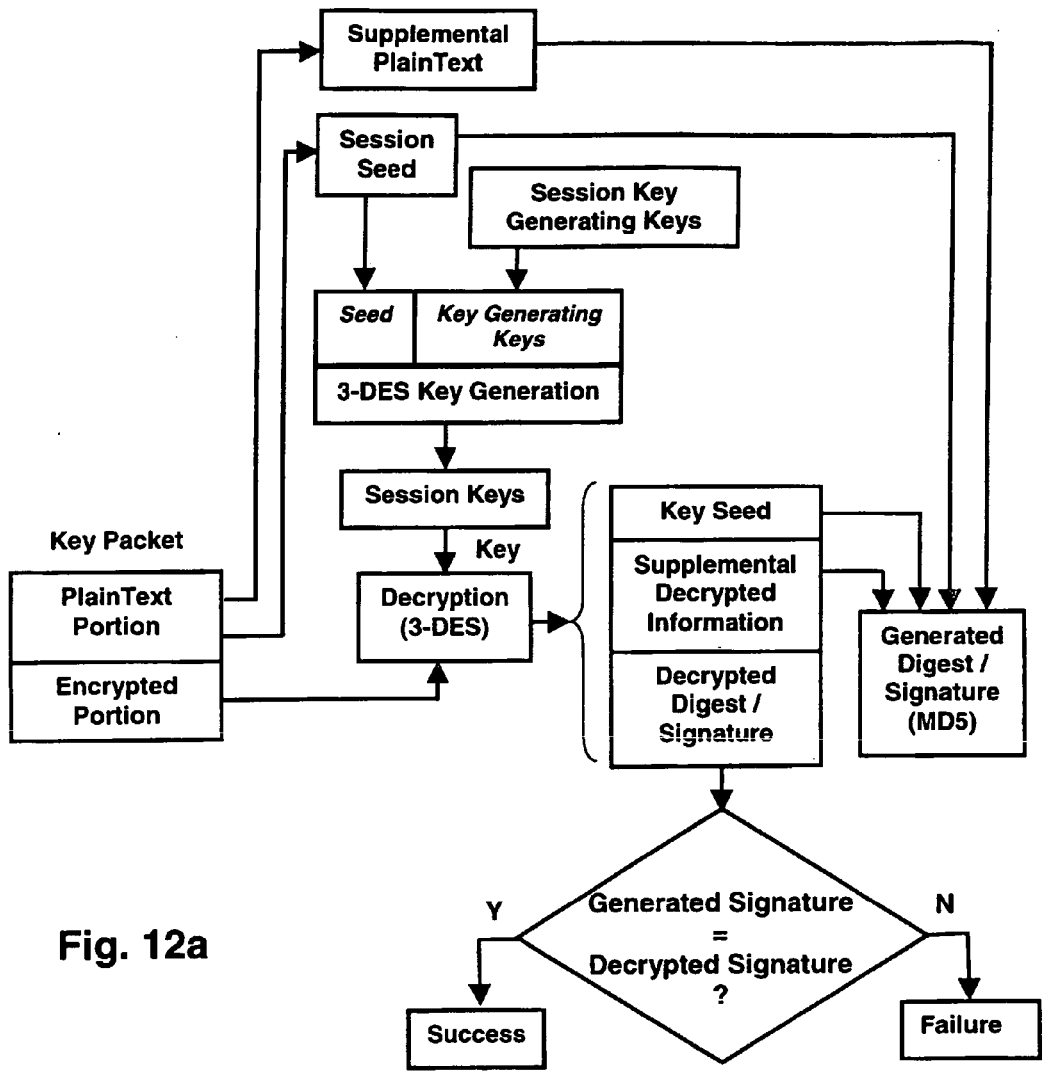
FIG. 12a illustrates a key loading process from the point-of-view of an associated Trusted Authorization Device.
Figure 12B:
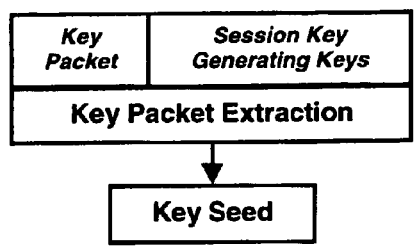

The process by which the TAD 10 receives the encrypted key seed from the key loading unit 38 and decrypts the key seed is illustrated in FIG. 12a, and is represented schematically in FIG. 12b.

Figure 13:
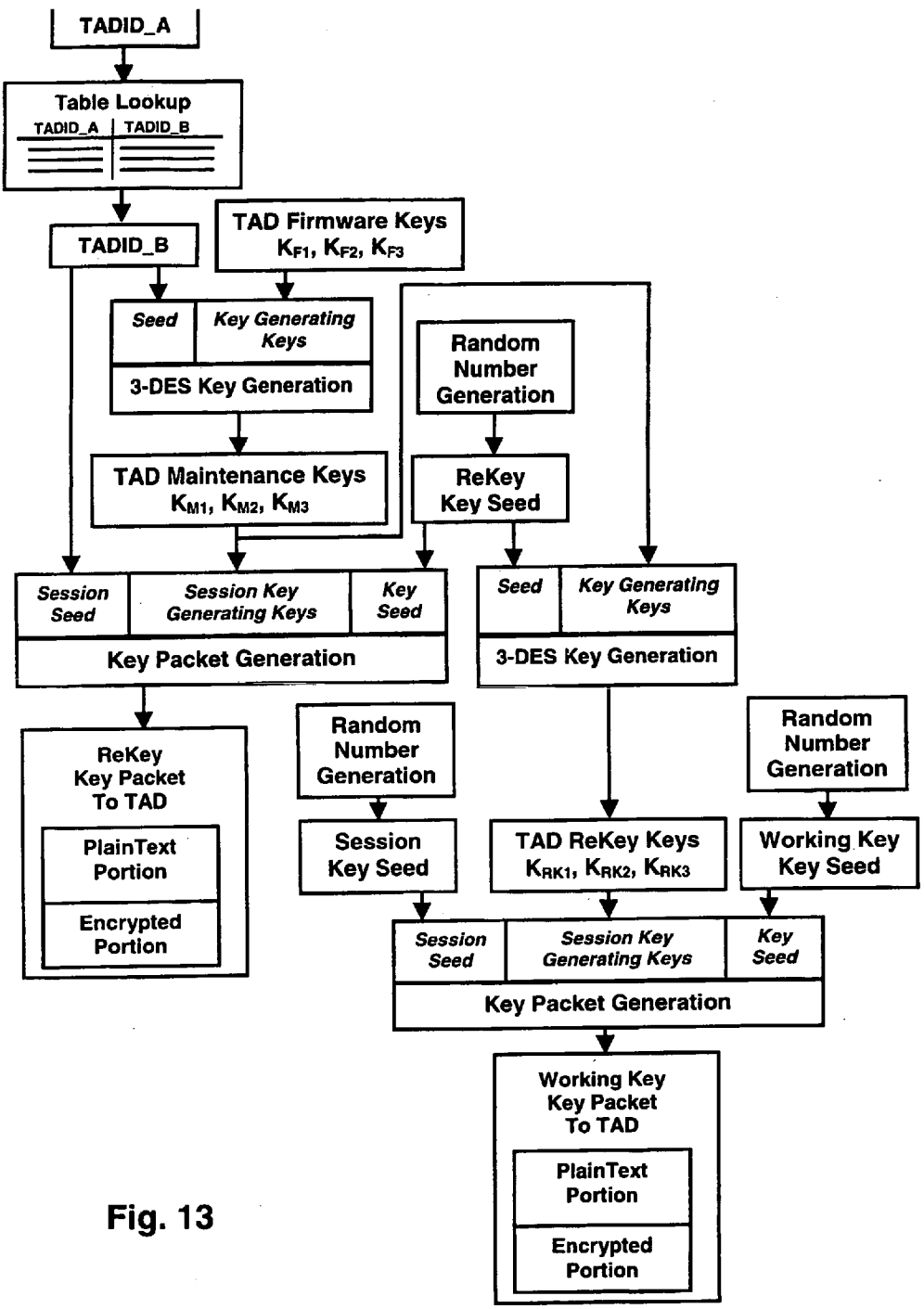
FIG. 13 illustrates a re-keying process from the point-of-view of an associated Key Loading Unit (KLU)

The process by which respective key seeds for the rekeying keys $K_{RK1}$, $K_{RK2}$, $K_{RK3}$ and the working keys $K_{w1}$, $K_{w2}$, $K_{w3}$ are respectively generated and encrypted by key loading unit 38, and transferred to the TAD 10, is illustrated in FIG. 13.

Figure 14:
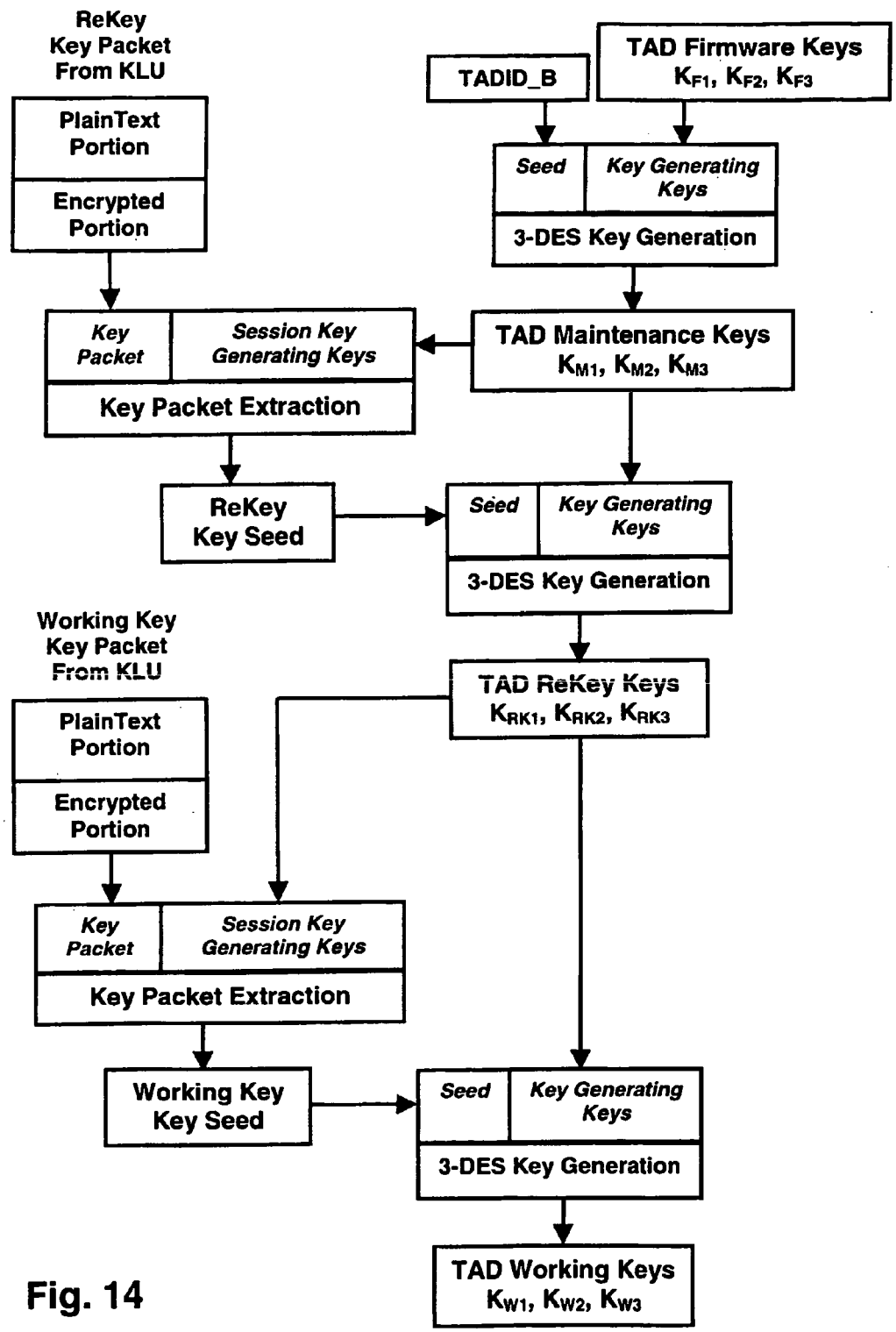
FIG. 14 illustrates a re-keying process from the point-of-view of an associated Trusted Authorization Device.

The process by which respective key seeds for the rekeying keys $K_{RK1}$, $K_{RK2}$, $K_{RK3}$ and the working keys $K_{w1}$, $K_{w2}$, $K_{w3}$ are received by the TAD 10 and used to generate the respective rekeying keys $K_{RK1}$, $K_{RK2}$, $K_{RK3}$ and working keys $K_{w1}$, $K_{w2}$, $K_{w3}$, is illustrated in FIG. 14.

Figure 15:
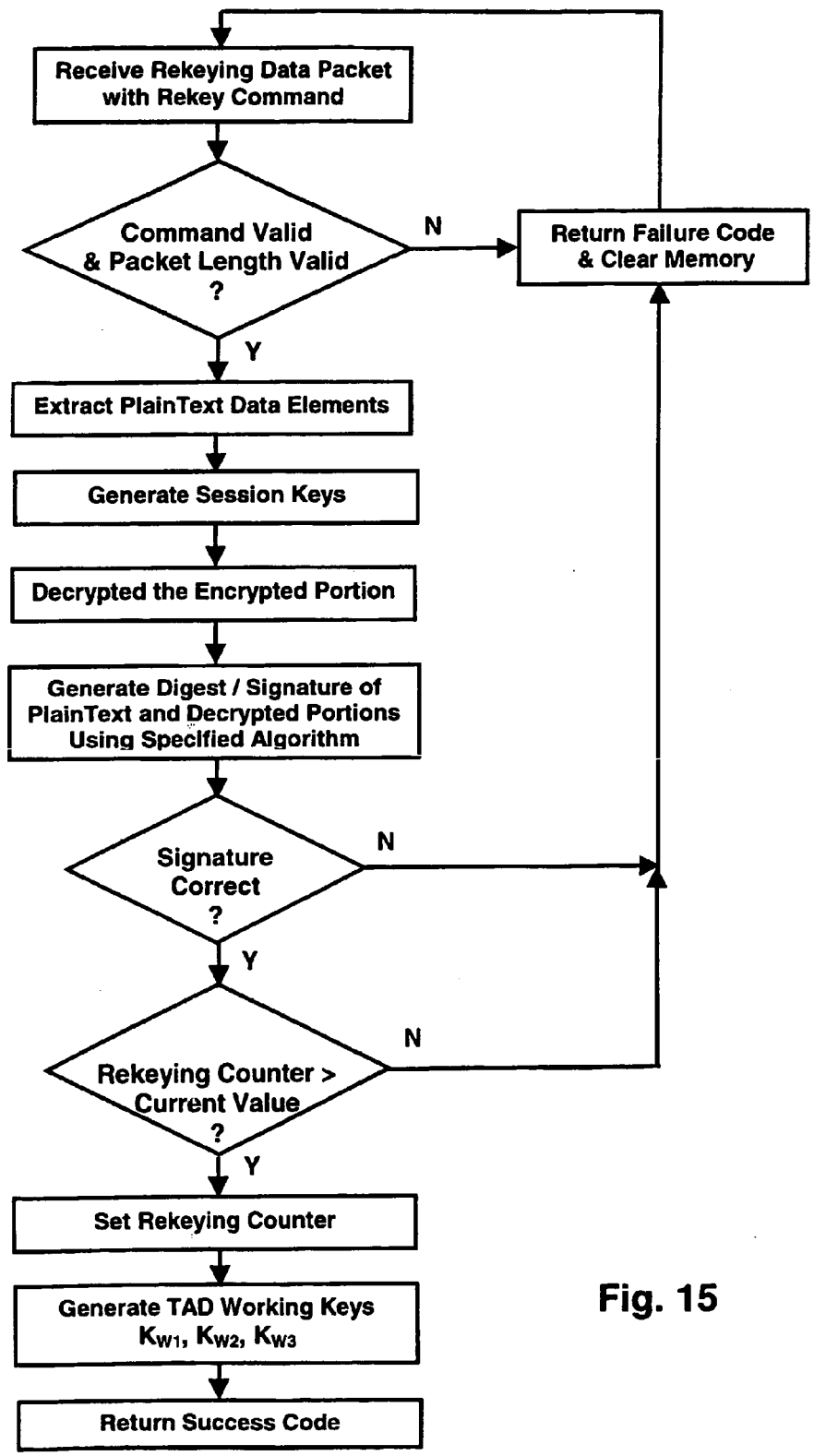
FIG. 15 illustrates a re-keying process from the point-of-view of an associated Trusted Authorization Device.

Referring also to FIG. 15, the key loading unit 38 provides for manual key distribution and management services using a limited set of commands. The TAD uses the maintenance key to decrypt the re-keying keys. This operation should be done locally via a direct connection to the key loading unit.

The TAD relies upon a set of 3 DES re-keying keys to load the unit keys that the unit relies upon. These re-keying keys are installed in the TAD 10 by the key loading unit 38 via the TAD maintenance keys, which are internally generated in the TAD by the interaction of the TAD firmware keyset (which is common to all the TAD's in a production lot) with a TAD-specific 64 bit Binary ID, TADID_B. The three maintenance keys are generated by permuting the order of the firmware keyset in a triple DES EDE encryption of the BID, i.e.

$Km1 = E_{Kf1}(D_{Kf2}(E_{Kf3}(TADID\_B)))$, $Km2 = E_{Kf3}(D_{Kf2}(E_{Kf1}(TADID\_B)))$, $Km3 = E_{Kf2}(D_{Kf1}(E_{Kf3}(TADID\_B)))$, (wherein E and D respectively represent the encryption and decryption sub-processes of a symmetric encryption process, e.g. triple DES (3 DES). Kf1 is the first firmware key. Km1 is the first maintenance key. etc.

Using the above processes the TAD can generate the TAD-specific maintenance keyset. Similarly, the keyloader, which knows the firmware keys and the BID can also generate and use the TAD-specific maintenance keyset. Thus, the keyloader can load the re-keying keys into the TAD.

Using the maintenance keys Km1, Km2, Km3, the re-keying keys $K_{RK1}$, $K_{RK2}$, $K_{RK3}$ are generated therein by execution of a load re-key command (a rekey command with no re-keying keys is assumed to be a load re-key command), having a command structure is:

| Clear text portion | |
| --- | --- |
| Re-key Command | 4 bytes (0XFFFFFFFF) |
| Re-keying block length (multiple of 8 bytes) | 4 bytes |
| Random number Rk | 24 bytes |

| Encrypted portion | |
| --- | --- |
| Random number length | 4 |
| Re-keying random number | as specified (initially 24) |
| digest prior to encryption | as appropriate |

The size of the structures may vary with system versions. The encryption keys in process are the maintenance keys Km1, Km2, Km3. Upon receiving a re-key command with no re-keying keys, the TAD 10 performs the following functions:

1. Check to make sure that the block is the right length (if wrong, return a failure code and clear the block);
2. Calculate the session keys, using the random number Rk provided in the clear text portion, as follows:
   a. Take the first 8 bytes of the session_random number, R1_and calculate session key 1, $Ks1 = E_{Km1}(D_{Km2}(E_{Km3}(R1)))$ (wherein E and D respectively represent the encryption and decryption sub-processes of a symmetric encryption process, e.g. triple DES (3 DES);
   b. Take the second 8 bytes of the session_random number, R2_and calculate session key 2, $Ks2 = E_{Km3}(D_{Km2}(E_{Km1}(R2)))$; and c. Take the third 8 bytes of the session random number, R3 and calculate session key 3, $Ks3 = E_{Km2}(D_{Km1}(E_{Km3}(R3)))$;

3. Decrypt the encrypted portion $D_{Ks3}(E_{s2}(D_{Ks1}(\text{encrypted portion})))$ using CBC mode;
4. Calculate the MD5 hash of the entire block cleartext+decrypted portion (digest block set to NULL);
5. Compare calculated digest with received digest (if wrong, return a failure code and clear the block);
6. Take the first 8 bytes of the re-keying random number, RKR1 and calculate re-keying key 1, $KrK1 = E_{Km1}(D_{Km2}(E_{Km3}(RkR1)))$;

7. Take the second 8 bytes of the re-keying random number, RkR2 and calculate re-keying key 2, $KrK2 = E_{km3}(D_{Km2}(E_{Km1}(RkR2)))$; and 8. Take the third 8 bytes of the re-keying random number, RkR3 and calculate re-keying key 3, $KrK3 = E_{Km2}(D_{Km1}(E_{Km3}(RkR3)))$.

The re-keying command can be issued after the re-keying keys $K_{r1}$, $K_{r2}$, $K_{r3}$ have been installed in the TAD 10 by the key loading unit 38, wherein the key loading unit 38 calculates the re-keying keys $K_{r1}$, $K_{r2}$, $K_{r3}$ from the binary ID (TADID_B). After the re-keying keys $K_{r1}$, $K_{r2}$, $K_{r3}$ are installed in the TAD 10 by the key loading unit 38, the working keys $K_{w1}$, $K_{w2}$, $K_{w3}$ are generated therein by execution of a re-key command, having a command structure is:

| Plaintext portion | |
|---|---|
| Re-key Command | 4 bytes (0XFFFFFFFF) |
| Re-keying block length (multiple of 8 bytes) | 4 bytes |
| Random number Rk | 24 bytes |

| Encrypted portion | |
|---|---|
| Re-keying counter | 4 |
| Random number length | 4 |
| Re-keying random number | as specified (initially 24) |
| digest prior to encryption | as appropriate |

The associated re-keying data structure, for example, does not have the flexibility of the general data structures. For example, the key loading unit 38 knows what algorithms are expected by the TAD 10 and uses the appropriate ones, hence there is no need for flexibility here. The size of the structures may vary with system versions. The encryption keys in process are not the working keys $K_{w1}$, $K_{w2}$, $K_{w3}$, but instead are the re-keying keys $K_{r1}$, $K_{r2}$, $K_{r3}$. Upon receiving a re-key command, the TAD 10 performs the following functions:

1. Check to make sure that the block is the right length (if wrong, return a failure code and clear the block);
2. Calculate the session keys, using the session random number $R_k$ provided in the plaintext portion, as follows:
   a. Take the first 8 bytes of the session random number, $R_1$, and calculate session key 1, $K_{s1}$:

$K_{s1} = E_{Kr1}(D_{Kr2}(E_{r3}(R_1)))$ (wherein E and D respectively represent the encryption and decryption sub-processes of a symmetric encryption process, e.g. triple DES (3 DES);
   b. Take the second 8 bytes of the session random number, $R_2$, and calculate session key 2, $K_{s2}$:

$K_{s2} = E_{Kr3}(D_{Kr2}(E_{Kr1}(R_2)))$; and c. Take the third 8 bytes of the session random number, $R_3$ (alternately, $R_3$ could be generated from $R_1$ and $R_2$ by $R_3 = R_1$ XOR $R_2$), and calculate session key 3, $K_{s3}$:

$K_{s3} = E_{Kr2}(D_{Kr1}(E_{Kr3}(R_3)))$.

3. Decrypt the encrypted portion $D_{Ks3}(E_{Ks2}(D_{Ks1}(\text{encrypted portion})))$ using CBC mode;
4. Calculate the MD5 hash of the entire block plaintext+decrypted portion (digest block set to NULL);
5. Compare calculated digest with received digest (if wrong, return a failure code and clear the block);
6. Check re-keying counter (which is initially set to 0). If less than current re-keying counter, return a failure code and clear the block;
7. Set re-keying counter and compute net unit working keys;
8. Take the first 8 bytes of the re-keying random number, $RkR_1$ and calculate working key 1, $K_{w1}$:

$K_{w1} = E_{Kr1}(D_{Kr2}(E_{Kr3}(RkR1)))$;

9. Take the second 8 bytes of the re-keying random number, $RkR_2$ and calculate working key 2, $K_{w2}$:

$K_{w2} = E_{Kr3}(D_{Kr2}(E_{Kr1}(RkR_2)))$; and

10. Take the third 8 bytes of the re-keying random number, $RkR_3$ (alternately, $R_3$ could be generated from $R_1$ and $R_2$ by $R_3 = R_1$ XOR $R_2$), and calculate working key 3, $K_{w3}$:

$K_{w3} = E_{Kr2}(D_{Kr1}(E_{Kr3}(RkR_3)))$.

After the working keys $K_{w1}$, $K_{w2}$, $K_{w3}$ are initially loaded by the key loading unit 38, the TAD 10 is placed in service proximate to the client 12 for providing trusted signing and authorization of transactions.

The one or more maintenance test keys are used for diagnosis and maintenance of the TAD 10, but generally not for purposes of data encryption. For example, in a diagnostic mode, the working keys are replaced with the maintenance keys, and are used to encode a dummy transaction, which can then be remotely decoded by maintenance personal to check that the TAD 10 is operating properly.

The data encryption process utilizes a random number R generated by a random number generator 44 within the trusted control processor 16 as a seed for an irreversible digest process (e.g. an asymmetric encryption process), e.g.

MD5, that signs a portion of token to be encrypted, and in combination with working keys $K_{w1}$, $K_{w2}$, $K_{w3}$ created by a separate key loading process and stored in memory 26, to generate a set of session keys $K_{s1}$, $K_{s2}$, $K_{s3}$ that are used in a symmetric encryption process, e.g. triple DES (3 DES) using cyclic block chaining (CBC) mode, to encrypt the signed message. The trusted control processor 16 also has a set of re-keying keys $K_{r1}$, $K_{r2}$, $K_{r3}$ that are generated by the key loading unit 38 in direct connection with the TAD 10 and stored in memory 26. The re-keying keys $K_{r1}$, $K_{r2}$, $K_{r3}$ thereafter enable the working keys $K_{w1}$, $K_{w2}$, $K_{w3}$ to be update remotely, for example, with new working keys $K_{w1}$, $K_{w2}$, $K_{w3}$ provided to the user 14 over a controlled path, e.g. via a floppy disc provided by mail or courier.

Referring to FIGS. 18, 19, 20, 26a, 27a, 28a, 29a, 30a, and 31a, the TAD 10 is controlled responsive to various types of TAD input commands that are communicated to the TAD 10 either by the client 12 or the key loading unit 38 over the telecommunications channel 24. FIGS. 20 illustrates the syntax of a command by a client 12 to authorize the signing and encryption of data in accordance with the normal operation of the TAD 10. FIG. 26a illustrates the syntax of a command by a client 12 or the key loading unit 38 to re-key the TAD 10. FIG. 28a illustrates the syntax of a command by a client 12 or the key loading unit 38 to insert a new language in the TAD 10, by which messages are displayed on the trusted display 18. For example, the TAD 10 is configured for selectable predefined languages of English, French, German or Spanish, and is provided with the capability of loading other languages/character sets, e.g. of Asian languages.

The TAD 10 has a straight forward interface with the client 12, for example, supporting the following three commands from the client:

Identify—which returns a text string, the TAD ID#, and the TAD version number.

Process_Transaction—which accepts a proposed transaction, if successful, returning a transaction packet Secure_Transaction—The TAD will display the commands to initiate the card swipe, transaction digest and encryption. The TAD command interface is as follows:

| | |
|---|---|
| Command | 4 bytes |
| Data length | 4 bytes |
| Data | as specified |

If no data or result is present, the length is set to 0.

Figure 16:
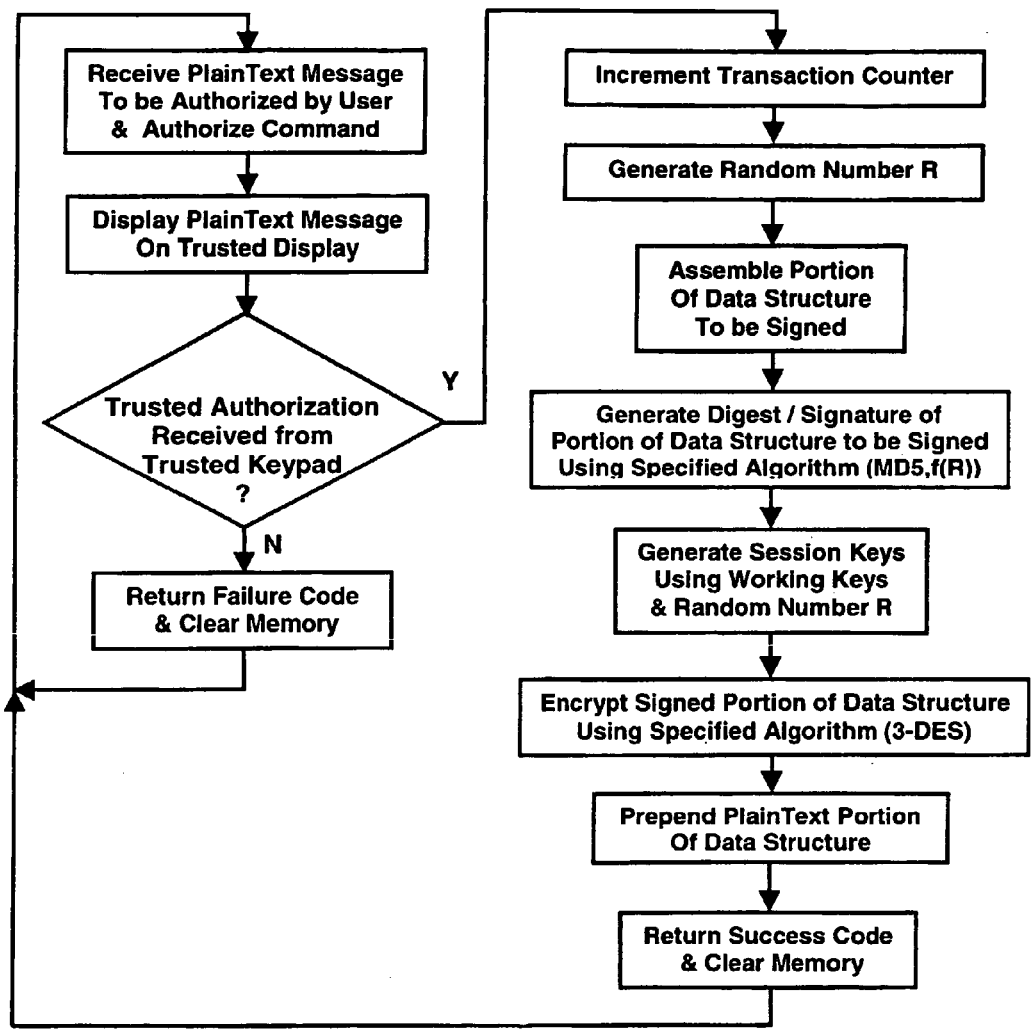
FIG. 16 illustrates a process for providing for a trusted authorization of a transaction from the point-of-view of an associated Trusted Authorization Device.

Referring to FIG. 16, the TAD 10 provides trusted authorization of transactions in accordance with the following process:

1. Client downloads transaction (a compact, <80 character string) to the TAD 10 in accordance with the command structure illustrated in FIG. 5a.
2. User observes displayed transaction and verifies that it is correct.
    a. If so, the user presses the GO/ACCEPT key.
    b. If not, the user presses the STOP/REJECT key.
3. If rejected, the TAD 10 signals the client and returns a "reject" code.
4. If accepted, the TAD 10 displays the downloaded instructions to the user.
5. The user following the instruction,
    a. swipes/enters the specified card,
    b. enters their secret PIN and,
    c. presses the GO/ACCEPT key,
    d. Pressing the STOP/REJECT key clears the transaction.
6. If rejected, the TAD 10 signals the client and returns a "reject" code.
7. If the transaction was accepted, the TAD 10
    a. digitally signs the captured card data and the PIN,
    b. packages this information with the transaction,
    c. appropriately encrypts the sensitive data, and
    d. prepares the transaction packet
8. The TAD 10 notifies the client of success and transfers the prepared transaction packet, or TAD Output Token, to the client, structured as indicated in FIGS. 21a, 21b, and 24, and by example in FIG. 25.

The data is read in wire order.

The TAD 10 is not limited to a particular type of encryption. The following table indicates an example of various algorithms that can be used for signing and encryption:

| Packet Digest Identifier | |
|---|---|
| 0D | 3 DES CBC digest using packet working key set |
| 1D | MD5 |
| 2D | MD160 |
| 3D | SHA1 |

| Packet Encryption Algorithm ID | |
|---|---|
| 0E | 3 DES CBC using packet working key set |
| 1E | 1 DES using key 1 of packet working key set |

The client 12 then transmits this to the appropriate host server 28. The transaction generated by the TAD 10 will pass through the communications network and then received by a host server 28 at the customer's site. The host server 28 will contain the alphanumeric ID (TADID_A) identification number, and corresponding unique working keys $K_{w1}$, $K_{w2}$, $K_{w3}$ in an encrypted form. When the host server 28 receives a transaction from the client 12 operated by the user 14, the host uses the alphanumeric ID (TADID_A) to retrieve the associated encrypted working keys $K_{w1}$, $K_{w2}$, $K_{w3}$. The host server 28 passes the encrypted working keys $K_{w1}$, $K_{w2}$, $K_{w3}$ and the encrypted transaction to the verification decryption server 32, thereby operating in a stateless mode. The VDS 32 does not have to store or manage working keys $K_{w1}$, $K_{w2}$, $K_{w3}$ (although for performance reasons one would expect it to cache previously supplied keys).

Figure 17:
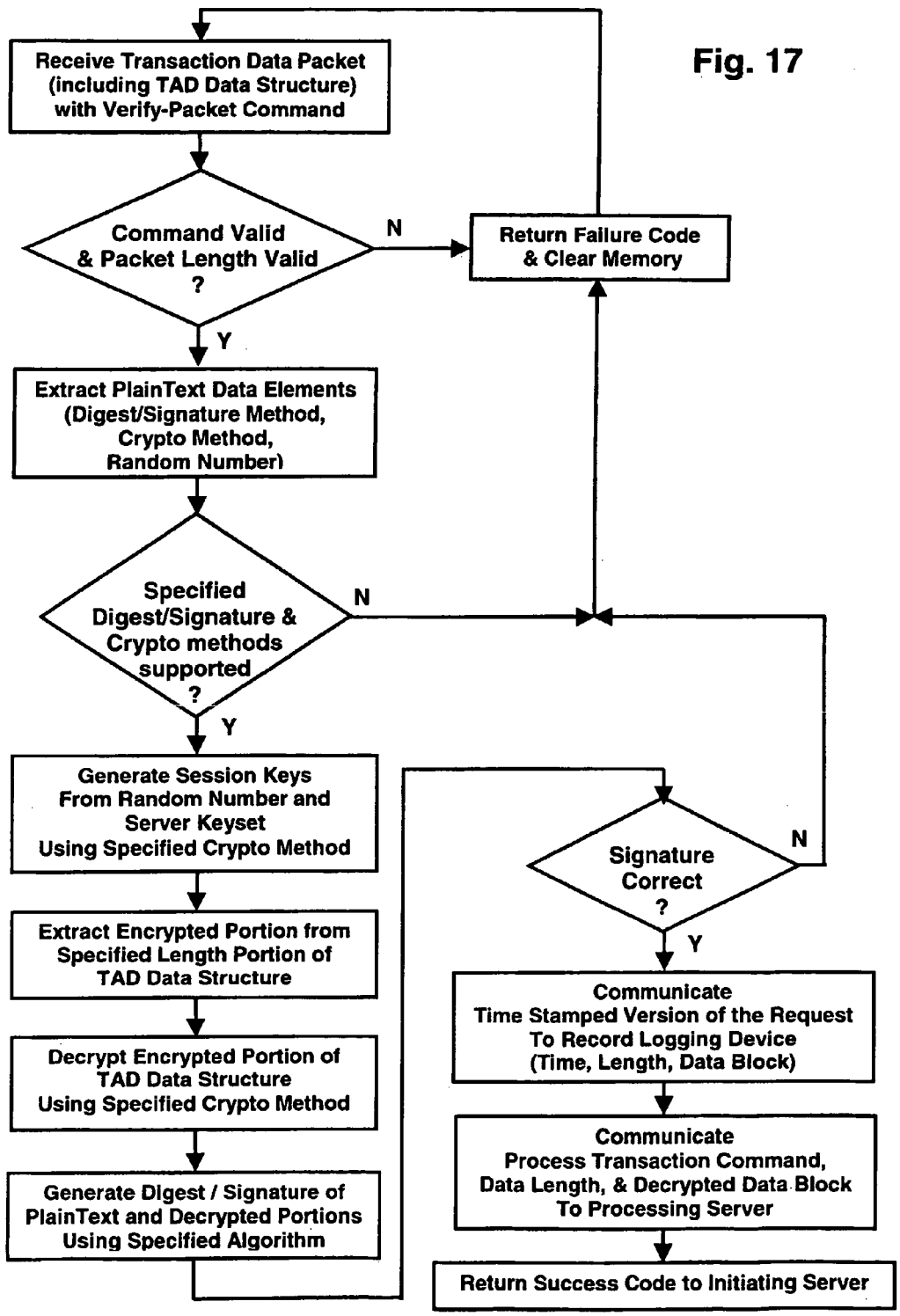
FIG. 17 illustrates a process for providing for a trusted authorization of a transaction from the point-of-view of an associated Verification Decryption Server (VDS)

Referring to FIG. 17, the VDS 32 initially operated as a single-threaded process operating entirely in memory, writing an audit log to hard disc. Once the VDS 32 accepts a transaction it completes the specified decryption and verification and returns the result before accepting another transaction. The host server 28 shall poll the VDS 32 before submitting a transaction for verification. The processes handled by the VDS 32, for example, includes the following:

Read the supplied data block
Read TAD ID
Look up decryption key value
Parse encrypted key data structure A VDS 32 has the decryption keys needed to decrypt the encrypted working keys $K_{w1}$, $K_{w2}$, $K_{w3}$. The host server 28 passes the encrypted working keys $K_{w1}$, $K_{w2}$, $K_{w3}$ to the VDS 32, with the following data format, for example, having a structure that is more general than that required to handle to initial implementation of 3 DES keys so as to be able to handle different secret or public key algorithms, as appropriate:

| Plaintext portion | |
|---|---|
| Element Identifier | Element Length |
| TAD Unit ID | 8 bytes |
| Key structure length | 4 bytes |
| Packet Digest Identifier | 2 bytes |
| Packet Encryption Algorithm ID | 2 bytes |
| Random number | 16 bytes |

| Encrypted portion | |
|---|---|
| Element Identifier | Element Length |
| TAD keys digest prior to encryption | packet length – (32 + digest) as appropriate |

The duplication of databases may be prevented by storing the wrapped TAD keys with the TAD and user data in the host server 28.

The use of two sets of unique DES key triplets: the unit re-keying key set, and the unit working key set, helps to reduce the processing and storage requirements that would otherwise be required with public key technology. The unit's re-keying key set is the basic key set for the unit. It can only be used with a single command, an encrypted command generated by the keying/re-keying server that causes the TAD 10 to generate the working keys $K_{w1}, K_{w2}, K_{w3}$ that are used in all security operations.

The key loading unit 38 and host server 28 are trusted with the either the binary ID (TADID_B) or the working keys $K_{w1}, K_{w2}, K_{w3}$, an accordingly are, for example, implemented so as to provide substantial assurance of the integrity of the storage and processing of these keys, for example, based upon Getronics (formerly Wang) STOP platforms (NSA evaluated B3). The associated communications protection devices are examined by trusted third parties so as to provide independent assurance concerning the device properties and characteristics.

The TAD 10 has been adapted to incorporate other devices into its trust perimeter such as a GPS receiver 46 and may be adapted to incorporate other devices, such as a signature input device 48, one or more biometric input devices 50 (e.g. voice, fingerprint, retinal scan), a camera, a breath analyzer 52, and etc.

Referring to FIG. 1, the security and authenticity of the TAD 10 may be with a GPS receiver 46, so as to enable a service provider to ascertain that the user 14 is at the correct prearranged physical location for the TAD 10, and that the TAD 10 has not been relocated. This is useful in certain business authorizations, where a TAD 10 is issued to a specific customer at a specific location. The use of the GPS receiver 48 allows the management system to provide strong assurance of the user's location, as well as provide an accurate time value (e.g. accurate to a millisecond or better). The coordinates (latitude, longitude, and/or altitude) from the GPS receiver 48 are stored in an associated field, e.g. Field #5 of the TAD Output data structure illustrated in FIG. 24, and are therefore signed and encrypted along with the rest of the encrypted portion of the TAD Output data structure. Accordingly, the service provider include a test of the decrypted position coordinates of the TAD 10 from the GPS receiver 46 in deciding whether or not to carry out the transaction requested by the user 14.

Whereas the TAD 10 is illustrated as a separate device, it should be understood that the TAD 10 could be embedded in the client 12. Furthermore, whereas the key loading unit 38 is illustrated as a single workstation within the trusted environment of the host server 28 and verification decryption server 32, it should be understood that the key loading unit 38 could be constructed as a portable unit that can be moved to the site of the TAD 10 by a trusted representative.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

We claim:

1. A method of providing for a trusted authorization of a transaction, comprising:
   a. providing for communicating with a first computer;
   b. providing for displaying first information to be authorized on a trusted display of a trusted authorization device, wherein said first information to be authorized is provided by said first computer;
   c. providing for receiving an authorization command from a trusted keypad of said trusted authorization device, wherein said authorization command is related to said first information; and
   d. if said authorization command provides for authorizing said first information, then providing for a set of operations by a trusted processor of said trusted authorization device, said set of operations comprising:
      i. generating a random number;
      ii. generating second information that is responsive to said first information to be authorized, wherein said second information further incorporates both said random number and a first identification code associated with said trusted authorization device, wherein said first identification code is stored on a trusted memory of said trusted authorization device;
      iii. generating a signature of said second information, wherein said signature is generated by a first encryption process;
      iv. generating a set of session keys by a second encryption process, wherein said second encryption process is responsive to said random number and to a set of stored working keys, and said set of stored working keys are stored on said trusted memory of said trusted authorization device;
      v. generating third information by encrypting said second information and said signature using a third encryption process that is responsive to said set of session keys; and
      vi. communicating to said first computer said random number, said first identification code, and said third information, wherein said random number and said first identification code are communicated in plaintext.

2. A method of providing for a trusted authorization of a transaction as recited in claim 1, further comprising providing for receiving a personal identification code from a user, wherein said personal identification code is incorporated in said second information.

3. A method of providing for a trusted authorization of a transaction as recited in claim 2, wherein said personal information code comprises a code entered with a trusted keypad of said trusted authorization device.

4. A method of providing for a trusted authorization of a transaction as recited in claim 2, wherein said personal information code is responsive to a biometric input from a user entered with a trusted biometric input device.

5. A method of providing for a trusted authorization of a transaction as recited in claim 2, wherein said personal information code is responsive to a signature input from a user entered with a trusted signature input device.

6. A method of providing for a trusted authorization of a transaction as recited in claim 2, wherein said personal information code is responsive to a voice input from a user entered with a trusted microphone.

7. A method of providing for a trusted authorization of a transaction as recited in claim 2, wherein said personal information code comprises a digest of at least one of a biometric input from a user entered with a trusted biometric input device, a signature input from a user entered with a trusted signature input device, and a voice input from a user entered with a trusted microphone.

8. A method of providing for a trusted authorization of a transaction as recited in claim 1, further comprising providing for receiving a personal identification code from a user, wherein the operation of providing for said set of operations by a trusted processor of said trusted authorization device is responsive to whether said personal identification code corresponds to a stored personal identification code, said stored personal identification code is stored in said trusted memory of said trusted authorization device, and said stored personal identification code is associated with an authentic user of said trusted authorization device.

9. A method of providing for a trusted authorization of a transaction as recited in claim 8, wherein said personal information code comprises a code entered with a trusted keypad of said trusted authorization device.

10. A method of providing for a trusted authorization of a transaction as recited in claim 8, wherein said personal information code is responsive to a biometric input from a user entered with a trusted biometric input device.

11. A method of providing for a trusted authorization of a transaction as recited in claim 8, wherein said personal information code is responsive to a signature input from a user entered with a trusted signature input device.

12. A method of providing for a trusted authorization of a transaction as recited in claim 8, wherein said personal information code is responsive to a voice input from a user entered with a trusted microphone.

13. A method of providing for a trusted authorization of a transaction as recited in claim 8, wherein said personal information code is associated with said trusted authorization device.

14. A method of providing for a trusted authorization of a transaction as recited in claim 8, wherein said personal information code comprises a digest of at least one of a biometric input from a user entered with a trusted biometric input device, a signature input from a user entered with a trusted signature input device, and a voice input from a user entered with a trusted microphone.

15. A method of providing for a trusted authorization of a transaction as recited in claim 1, further comprising providing for receiving fourth information from a physical token in possession of a user and incorporating at least a portion of said fourth information in said second information.

16. A method of providing for a trusted authorization of a transaction as recited in claim 15, wherein said physical token is selected from a credit card, a debit card, and a smart card.

17. A method of providing for a trusted authorization of a transaction as recited in claim 16, wherein the operation of receiving fourth information from a physical token comprises reading said fourth information from said physical token using a trusted reader.

18. A method of providing for a trusted authorization of a transaction as recited in claim 17, wherein said fourth information is stored on a magnetic strip of said physical token, and the operation of receiving fourth information from a physical token comprises reading said fourth information from said magnetic strip using a trusted magnetic card reader.

19. A method of providing for a trusted authorization of a transaction as recited in claim 15, further comprising providing for receiving a personal identification code from a user, and incorporating said personal identification code in said second information, wherein said personal information code is associated with said physical token.

20. A method of providing for a trusted authorization of a transaction as recited in claim 15, further comprising providing for receiving a personal identification code from a user, wherein said personal information code is associated with said physical token, the operation of providing for said set of operations by a trusted processor of said trusted authorization device is responsive to whether said personal identification code corresponds to a stored personal identification code stored in said physical token, and said stored personal identification code is associated with an authentic user of said physical token.

21. A method of providing for a trusted authorization of a transaction as recited in claim 1, wherein said random number is a true random number, and said true random number is responsive to a physical process.

22. A method of providing for a trusted authorization of a transaction as recited in claim 1, wherein said second information comprises at least a portion of said first information.

23. A method of providing for a trusted authorization of a transaction as recited in claim 1, further comprising:
   a. incrementing a transaction counter; and
   b. incorporating the value of said transaction counter in said second information.

24. A method of providing for a trusted authorization of a transaction as recited in claim 23, further comprising communicating in plaintext to said first computer the value of said transaction counter.

25. A method of providing for a trusted authorization of a transaction as recited in claim 1, further comprising providing for receiving location information from a trusted location device and incorporating said location information in said second information, wherein said location information is related to the location of said trusted authorization device.

26. A method of providing for a trusted authorization of a transaction as recited in claim 25, wherein said trusted location device comprises a trusted GPS receiver.

27. A method of providing for a trusted authorization of a transaction as recited in claim 1, wherein said first encryption process comprises a Data Encryption Standard (DES) cyclic block code (CBC) manipulation detection code (MDC) using said random number as an initial vector.

28. A method of providing for a trusted authorization of a transaction as recited in claim 1, wherein said first encryption process comprises a digest algorithm selected from MD5 and SHA-1.

29. A method of providing for a trusted authorization of a transaction as recited in claim 1, wherein said first encryption process comprises a Public Key Infrastructure (PKI) encryption algorithm using a private key that is associated with either said trusted authorization device or a physical token at least temporarily operatively connected to said trusted authorization device, wherein said first encryption process operates on a digest of said second information.

30. A method of providing for a trusted authorization of a transaction as recited in claim 1, wherein said second encryption process comprises a symmetric encryption of said random number using said set of working keys that are stored in said trusted memory of said transaction authorization device.

31. A method of providing for a trusted authorization of a transaction as recited in claim 30, wherein said working keys are generated by a fourth encryption process, and said fourth encryption process is responsive to a second identification code associated with said trusted authorization device, and to a set of rekeying keys stored in said trusted memory of said trusted authorization device.

32. A method of providing for a trusted authorization of a transaction as recited in claim 1, further comprising communicating in plaintext to said first computer at least one encryption algorithm identification code associated with at least one of said first encryption process and said third encryption process.

33. A method of providing for a trusted authorization of a transaction, comprising:
 a. providing for initiating a transaction on a first computer responsive to at least one input from a user;
 b. providing for communicating first information to a transaction authorization device, wherein said first information is related to said transaction, and said transaction authorization device is operatively connected to said first computer;
 c. providing for receiving a data structure from said transaction authorization device, wherein said data structure is responsive to said first information, said data structure comprises a random number, a first identification code, and third information, said third information comprises an encryption by a third encryption process of both second information and a signature responsive to said second information, a first portion of said second information is responsive to said first information, a second portion of said second information comprises said random number, a third portion of said second information comprises said first identification code, said random number is generated by said trusted authorization device, and said first identification code is associated with said trusted authorization device; and
 d. providing for communicating said data structure to a host server computer, wherein said data structure provides for a trusted authorization of said transaction.

34. A method of providing for a trusted authorization of a transaction, comprising:
 a. providing for receiving by a first computer a data structure from a second computer, wherein said data structure is responsive to first information, said first information is related to a transaction to be authorized, said data structure comprises a random number, a first identification code, and third information, said third information comprises an encryption by a third encryption process of both second information and a signature by a first encryption process responsive to said second information, a first portion of said second information is responsive to said first information, a second portion of said second information comprises said random number, a third portion of said second information comprises said first identification code;
 b. providing for retrieving a set of stored working keys, wherein said operation of retrieving is responsive to said first identification code;
 c. providing for generating a set of session keys by a second encryption process, wherein said second encryption process is responsive to said random number and to said set of stored working keys;
 d. providing for generating second information and fifth information by decrypting said third information using said third encryption process that is responsive to said set of session keys;
 e. providing for generating a signature of said second information, wherein said signature is generated by said first encryption process;
 f. providing for comparing said signature with said fifth information; and
 g. if said signature matches said fifth information, then providing for acting upon said second information.

35. A method of providing for a trusted authorization of a transaction as recited in claim 25, further comprising providing for transmitting to a third computer said random number, a set of encrypted working keys for said third encryption process and said third information, and receiving from said third computer a result, wherein said set of encrypted working keys is responsive to said first identification code, said set of encrypted working keys are encrypted with a set of keys of said third computer, the operation of providing for acting upon said second information is responsive to said result and said third computer performs the operations of providing for generating said set of session keys, providing for generating said second information and said fifth information, providing for generating said signature of said second information, and providing for comparing said signature with said fifth information.

36. A method of authorizing a transaction responsive to a data structure, comprising:
 a. receiving said data structure, wherein said data structure is responsive to first information, said first information is related to a transaction to be authorized, said data structure comprises a random number, a first identification code, and third information, said third information comprises an encryption by a third encryption process of both second information and a signature by a first encryption process responsive to said second information, a first portion of said second information is responsive to said first information, a second portion of said second information comprises said random number, a third portion of said second information comprises said first identification code;
 b. retrieving or receiving a set of stored working keys, wherein said operation of retrieving is responsive to said first identification code;
 c. generating a set of session keys by a second encryption process, wherein said second encryption process is responsive to said random number and to said set of stored working keys;
 d. generating second information and fifth information by decrypting said third information using said third encryption process that is responsive to said set of session keys;
 e. generating a signature of said second information, wherein said signature is generated by said first encryption process;
 f. comparing said signature with said fifth information; and g. transmitting a result of the operation of comparing said signature with said fifth information.

37. A method of authorizing a transaction responsive to a data structure as recited in claim 36, wherein said set of stored working keys are encrypted, further comprising decrypting said set of stored working keys prior to the operation of generating a set of session keys.

38. A memory for storing data for access by an application program being executed on a computer, comprising a data structure stored in said memory, wherein said data structure is responsive to first information, said first information is related to a transaction to be authorized, and said data structure comprises
 a. a first data object comprising a random number;
 b. a second data object comprising a first identification code; and
 c. a third data object comprising third information, wherein said third information comprises an encryption by a third encryption process of both second information and a signature by a first encryption process responsive to said second information, said third encryption process is responsive to a set of session keys that are responsive to said random number, a first portion of said second information is responsive to said first information, a second portion of said second information comprises said random number, a third portion of said second information comprises said first identification code.

39. A memory for storing data for access by an application program being executed on a computer as recited in claim 38, wherein said data structure further comprises a fourth data object comprising a value of a transaction counter.

40. A memory for storing data for access by an application program being executed on a computer as recited in claim 38, wherein said second information incorporates a value of a transaction counter.

* * * * *